(12) United States Patent
Suzuki et al.

(10) Patent No.: US 8,586,144 B2
(45) Date of Patent: Nov. 19, 2013

(54) METHOD FOR FORMING ANTI-REFLECTION COATING AND OPTICAL ELEMENT

(75) Inventors: Mineta Suzuki, Saitama (JP); Takanobu Shiokawa, Kanagawa (JP); Kazuhiro Yamada, Saitama (JP); Hiroyuki Nakayama, Tokyo (JP); Hideki Yamaguchi, Kyoto (JP); Ayako Maruta, Kyoto (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 476 days.

(21) Appl. No.: 12/407,890

(22) Filed: Mar. 20, 2009

(65) Prior Publication Data

US 2009/0244709 A1    Oct. 1, 2009

(30) Foreign Application Priority Data

Mar. 25, 2008    (JP) ................... 2008-078477

(51) Int. Cl.
*B05D 3/10*    (2006.01)

(52) U.S. Cl.
USPC ............ 427/344; 427/337; 427/343; 427/387

(58) Field of Classification Search
USPC ................... 427/387, 337, 343, 344
See application file for complete search history.

(56) References Cited

U.S. PATENT DOCUMENTS

| | | | |
|---|---|---|---|
| 5,948,482 A | 9/1999 | Brinker et al. | |
| 6,596,250 B2 | 7/2003 | Greenwood et al. | |
| 6,764,543 B2 * | 7/2004 | Greenwood et al. | 106/737 |
| 6,800,130 B2 | 10/2004 | Greenwood et al. | |
| 7,931,940 B2 | 4/2011 | Suzuki et al. | |
| 2002/0011191 A1 | 1/2002 | Greenwood et al. | |
| 2003/0200902 A1 | 10/2003 | Greenwood et al. | |
| 2004/0039088 A1 | 2/2004 | Greenwood et al. | |
| 2006/0154044 A1 * | 7/2006 | Yamada et al. | 428/312.2 |
| 2009/0087665 A1 | 4/2009 | Suzuki et al. | |

FOREIGN PATENT DOCUMENTS

| | | |
|---|---|---|
| JP | 2003-53804 | 12/2003 |
| JP | 2005-202240 | 7/2005 |
| JP | 2005-221911 | 8/2005 |
| JP | 2006-011175 | 1/2006 |
| JP | 2006-151800 | 6/2006 |
| JP | 2006-215542 | 8/2006 |
| JP | 2006-227596 | 8/2006 |
| JP | 2007-052345 | 3/2007 |
| JP | 2009-075583 | 4/2009 |

OTHER PUBLICATIONS

Jue et al. Journal of Sol-Gel Science and Technology 2000, vol. 18 pp. 219-224.

(Continued)

*Primary Examiner* — Robert S Walters, Jr.
(74) *Attorney, Agent, or Firm* — Greenblum & Bernstein, P.L.C.

(57) ABSTRACT

A method for forming an anti-reflection coating of alkali-treated silica aerogel on a substrate, comprising the steps of hydrolyzing and polymerizing alkoxysilane in the presence of a base catalyst to prepare an alkaline sol, adding an acid catalyst to the alkaline sol to carry out further hydrolysis and polymerization to prepare a first acidic sol, hydrolyzing and polymerizing alkoxysilane in the presence of an acid catalyst to prepare a second acidic sol, mixing the first and second acidic sols, applying the resultant mixed sol to the substrate, drying it, and treating the resultant silica aerogel coating with an alkali.

10 Claims, 4 Drawing Sheets

(56) References Cited

OTHER PUBLICATIONS

U.S. Appl. No. 12/342,128 (Yamada et al.) filed Dec. 23, 2008 and entitled "Anti-Reflection Coating, Optical Member, Exchange Lens Unit and Imaging Device."

Jue Wang et al., "Scratch-Resistant Improvement of Sol-Gel Derived Nano-Porous Silica Films", Journal of Sol-Gel Science and Technology, Netherlands, 2000, vol. 18, pp. 219-224.

Japan Office action, dated Feb. 26, 2013 along with an english translation thereof.

* cited by examiner

METHOD FOR FORMING ANTI-REFLECTION COATING AND OPTICAL ELEMENT

FIELD OF THE INVENTION

The present invention relates to a method for forming an anti-reflection coating comprising at least an alkali-treated silica aerogel coating having nanometer-sized fine pores, and an optical element comprising such an anti-reflection coating, particularly to a method for forming an anti-reflection coating comprising at least an alkali-treated silica aerogel coating having a low refractive index and excellent scratch resistance, and an optical element comprising such an anti-reflection coating.

BACKGROUND OF THE INVENTION

Anti-reflection coatings are conventionally formed by physical vapor deposition such as vacuum vapor deposition, sputtering, ion plating, etc. Single-layer anti-reflection coatings should have smaller refractive indices than those of substrates, but even the smallest-refractive-index $MgF_2$ layers formed by a physical vapor deposition method have as relatively large a refractive index as 1.38, failing to have a refractive index of 1.2-1.25 ideal for lenses having refractive indices of about 1.5. An anti-reflection coating having a refractive index of 1.2-1.25 exhibits reflectance of less than 1% in a visible-light region having a wavelength of 400-700 nm, while an anti-reflection coating of $MgF_2$ having a refractive index of 1.38 has reflectance of more than 1%, though less than 2%.

A liquid phase method such as a sol-gel method is recently used to form anti-reflection coatings. The liquid phase method does not need a large apparatus unlike the physical vapor deposition method, and can form anti-reflection coatings without exposing substrates to high temperatures. Anti-reflection coatings obtained by the liquid phase method have the minimum refractive index of nearly 1.37, on the same level as those obtained by the physical vapor deposition method, and their anti-reflection characteristics are not largely improved. In both methods, it is necessary to laminate low-refractive-index materials and high-refractive-index materials to a multilayer coating to suppress reflectance in a visible wavelength region to less than 1%.

Silica aerogel is known as a material having a smaller refractive index than that of $MgF_2$. When alkoxysilane is hydrolyzed to form a wet silica gel, which is dried by a supercritical fluid of carbon dioxide, water, an organic solvent, etc., silica aerogel having a density of 0.01 g/cc or less and a refractive index of less than 1.1 is produced. However, this method is disadvantageous in needing a supercritical drying apparatus and a lot of steps, and thus high cost. Also, the silica aerogel obtained by this method cannot be used for practical applications because of extremely low toughness (high brittleness).

U.S. Pat. No. 5,948,482 discloses a method for producing a silica aerogel coating, comprising the steps of (a) preparing a $SiO_2$-containing sol, (b) aging it to a gel, (c) modifying the gel surface with an organic group, (d) turning the surface-modified gel to sol by a ultrasonic treatment, and (e) applying the sol to a substrate. The resultant silica aerogel coating has porosity of up to 99% (low refractive index), but it is poor in mechanical strength and scratch resistance.

"Journal of Sol-Gel Science and Technology," 2000, Vol. 18, pp. 219-224 proposes a method for producing a nanoporous silica coating having excellent scratch resistance comprising the steps of hydrolyzing and polymerizing tetraethoxysilane in the presence of ammonia in a mixed solvent of ethanol and water at 80° C. for 2-20 hours to prepare an alkaline sol, adding tetraethoxysilane, water and hydrochloric acid and aging the resultant mixture at 60° C. for 15 days, applying the formed sol to a substrate, drying it at 80° C. for 30 minutes, and heat-treating it in a mixed gas of ammonia and steam or in the air at 400° C. for 30 minutes. However, this method needs 15-day aging, meaning low efficiency, and the resultant nanoporous silica coating has insufficient scratch resistance, and poor transparency and strength.

OBJECT OF THE INVENTION

Accordingly, an object of the present invention is to provide a method for forming an anti-reflection coating comprising at least a silica aerogel coating having a low refractive index and excellent scratch resistance in a relatively short period of time, and an optical element comprising such an anti-reflection coating.

DISCLOSURE OF THE INVENTION

As a result of intensive research in view of the above object, the inventors have found that a silica aerogel coating having a low refractive index and excellent scratch resistance can efficiently be formed in a relatively short period of time, by mixing a first acidic sol obtained by hydrolyzing and polymerizing alkoxysilane successively in the presence of a base catalyst and an acid catalyst, with a second acidic sol obtained by hydrolyzing and polymerizing alkoxysilane in the presence of an acid catalyst, applying the resultant mixed sol to a substrate, and treating the resultant silica aerogel coating with alkali. The present invention has been completed based on such finding.

Thus, the method of the present invention for forming a first anti-reflection coating of alkali-treated silica aerogel on a substrate comprises the steps of hydrolyzing and polymerizing alkoxysilane in a solvent in the presence of a base catalyst to prepare an alkaline sol, adding an acid catalyst to the alkaline sol to carry out further hydrolysis and polymerization to prepare a first acidic sol, hydrolyzing and polymerizing alkoxysilane in a solvent in the presence of an acid catalyst to prepare a second acidic sol, mixing the first and second acidic sols, applying the resultant mixed sol to the substrate, drying it, and treating the resultant silica aerogel coating with an alkali.

The method of the present invention for forming a second anti-reflection coating comprising a single-layer or multi-layer dense coating and an alkali-treated silica aerogel coating on a substrate, comprising the steps of forming a single-layer or multilayer dense coating comprising at least one of an inorganic layer, a composite layer of fine inorganic particles and a binder and a resin layer on the substrate, hydrolyzing and polymerizing alkoxysilane in a solvent in the presence of a base catalyst to prepare an alkaline sol, adding an acid catalyst to the alkaline sol to carry out further hydrolysis and polymerization to prepare a first acidic sol, hydrolyzing and polymerizing alkoxysilane in a solvent in the presence of an acid catalyst to prepare a second acidic sol, mixing the first and second acidic sols, applying the resultant mixed sol to the single-layer or multilayer dense coating, drying it, and treating the resultant silica aerogel coating with an alkali.

The first acidic sol is preferably prepared using tetraalkoxysilane or its oligomer as the alkoxysilane. Ammonia is preferably used as the base catalyst. Methanol is preferably used as the solvent.

The second acidic sol is preferably prepared using at least one selected from the group consisting of methyltrialkoxysilane, tetraalkoxysilane and their oligomers as the alkoxysilane. Hydrochloric acid is preferably used as the acid catalyst for preparing the second acidic sol. Methanol and/or ethanol are preferably used as the solvent.

To achieve excellent scratch resistance, the solid content mass ratio of the first acidic sol to the second acidic sol in the mixed sol is preferably 5-90. The median size ratio of the first acidic sol to the second acidic sol in the mixed sol is preferably 5-50. The alkali-treated silica aerogel coating preferably has a physical thickness of 15-500 nm.

The alkali treatment is conducted by coating the silica aerogel coating with a solution of at least one alkali selected from the group consisting of inorganic alkalis, inorganic alkali salts, organic alkalis and alkali salts of organic acids, or by bringing the silica aerogel coating into contact with an ammonia gas. The concentration of the alkali solution is preferably $1 \times 10^{-4}$ N to 20 N.

The optical element of the present invention comprises an anti-reflection coating formed by the above method on an optical substrate.

The optical substrate is preferably in a shape of a flat plate or a lens. In a projected area of an effective region of the lens-shaped optical substrate, a portion in which the lens-shaped optical substrate has a surface inclination angle of 50° or more is preferably 10% or more. Such lens-shaped optical substrate is suitable for a pickup lens for an apparatus for recording and regenerating light information.

DESCRIPTION OF THE PREFERRED EMBODIMENTS

[1] Formation Method of Anti-Reflection Coating

Figure 1A:
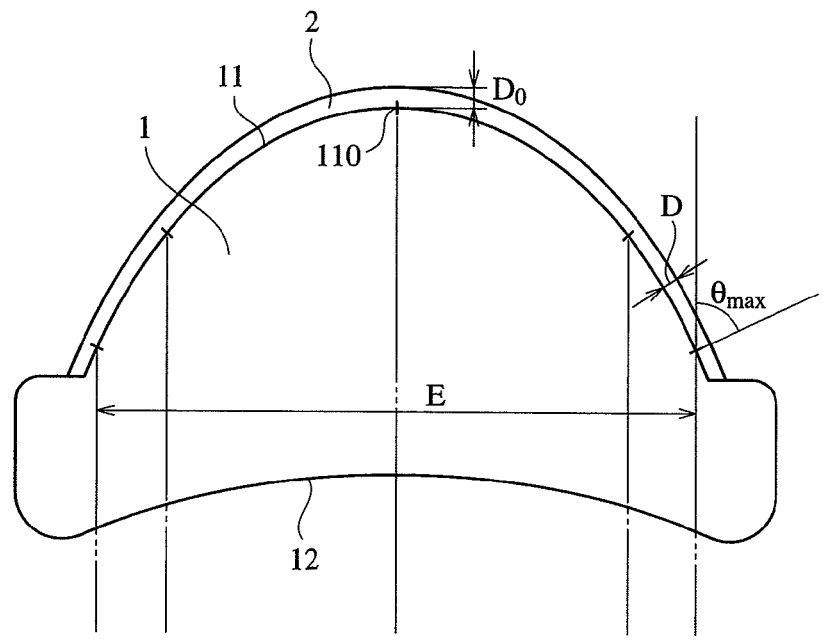
FIG. 1(a) is a vertical cross-sectional view showing one example of the optical elements of the present invention.

The anti-reflection coating of the present invention is formed by the steps of (1) (a) hydrolyzing and polymerizing alkoxysilane in a solvent in the presence of a base catalyst to prepare an alkaline sol, (b) adding an acid catalyst to the alkaline sol to carry out further hydrolysis and polymerization to prepare a first acidic sol, (2) hydrolyzing and polymerizing alkoxysilane in a solvent in the presence of an acid catalyst to prepare a second acidic sol, (3) mixing the first and second acidic sols, (4) applying the resultant mixed sol to a substrate, (5) drying it, (6) treating the resultant silica aerogel coating with an alkali, and (7) drying it. A washing step (8) may be conducted if necessary before and/or after the step (7).

After the silica aerogel coating is formed on the dense coating formed on the substrate, the silica aerogel coating may be treated with an alkali to form a multilayer anti-reflection coating.

(1) Preparation of First Acidic Sol (a) Hydrolysis and Polymerization in the Presence of Base Catalyst Alkoxysilane is hydrolyzed and polymerized in a solvent in the presence of a base catalyst to prepare an alkaline sol.

(i) Starting Materials

Alkoxysilane is preferably tetraalkoxysilane. With alkoxysilane having trifunctional or less groups used as a starting material, it is difficult to obtain a sol having a relatively large median size. However, a small amount of alkoxysilane having trifunctional or less groups may be used together with tetraalkoxysilane as alkoxysilane in such a range as not hindering the effect of the present invention. Tetraalkoxysilane may be in the form of a monomer or an oligomer. The tetraalkoxysilane monomer is expressed by the formula: $Si(OR)_4$, wherein R is preferably an alkyl group having 1-5 carbon atoms or an acyl group having 1-4 carbon atoms, specifically a methyl group, an ethyl group, an n-propyl group, an i-propyl group, an n-butyl group, a sec-butyl group, a tert-butyl group, an acetyl group, etc.

The tetraalkoxysilane monomers include tetramethoxysilane, tetraethoxysilane, tetrapropoxysilane, tetrabutoxysilane, diethoxydimethoxysilane, etc. Among them, tetramethoxysilane and tetraethoxysilane are preferable. The tetraalkoxysilane oligomers are preferably polycondensates of the above monomers.

The base catalyst may be NaOH, KOH, ammonia and amines. Preferred examples of the amines include alcohol amines and alkyl amines (methylamine, dimethylamine, trimethylamine, n-propylamine, n-butylamine, etc.).

The solvent is preferably alcohols such as methanol, ethanol, n-propanol, i-propanol, and butanol, more preferably methanol and ethanol.

(ii) Hydrolysis and Polymerization

The alkoxysilane is dissolved in a solvent. A solvent/alkoxysilane molar ratio is preferably 3-100. When this molar ratio is less than 3, the sol has too large a particle size. When the solvent/alkoxysilane molar ratio is more than 100, the sol has too small a particle size. A base catalyst and water are added to alkoxysilane solution. A molar ratio of the base catalyst to alkoxysilane is preferably $1 \times 10^{-4}$ to 1, more preferably $1 \times 10^{-4}$ to 0.8, most preferably $3 \times 10^{-4}$ to 0.5. When this molar ratio is less than $1 \times 10^{-4}$, the hydrolysis reaction of alkoxysilane does not occur sufficiently. Even if the molar ratio were more than 1, the catalytic effect would not increase. A water/alkoxysilane molar ratio is preferably 0.1-5. When this molar ratio is more than 5, the hydrolysis reaction is too fast. When this molar ratio is less than 0.1, the hydrolysis of alkoxysilane does not occur sufficiently.

An alkaline solution containing alkoxysilane is aged for about 10 hours to about 60 hours. Specifically, the solution is left to stand at 10-90° C., or slowly stirred. The polymerization proceeds by aging to form a sol containing silicon oxide. The "sol containing silicon oxide" herein includes a dispersion of colloidal silicon oxide particles and a dispersion of sol cluster of aggregated colloidal particles.

(b) Hydrolysis and Polymerization in the Presence of Acid Catalyst

An acid catalyst, water and a solvent are added to the resultant alkaline sol to conduct further hydrolysis and polymerization to prepare the first acidic sol. Examples of the acid catalysts include hydrochloric acid, nitric acid, sulfuric acid, phosphoric acid and acetic acid. The solvent may be the same as described above.

A solvent/alkoxysilane molar ratio (charge ratio) in the first acidic sol may be the same as described above. The molar ratio (charge ratio) of the acid catalyst to the base catalyst is preferably 1.1-10, more preferably 1.5-5, most preferably 2-4. When this molar ratio is less than 1.1, the polymerization does not proceed sufficiently in the presence of the acid catalyst. Even if this molar ratio were more than 10, the catalytic effect would not increase. The molar ratio (charge ratio) of water to alkoxysilane in the first acidic sol may be the same as described above.

The sol is aged for about 15 minutes to about 24 hours in the presence of the acid catalyst. Specifically, the sol is left to stand or slowly stirred at 10-90° C. The polymerization further proceeds by aging.

(c) Median Size of Sol

The first acidic sol obtained by the hydrolysis and polymerization of alkoxysilane in a solvent using a base catalyst and an acid catalyst in this order as described above has a median size of 100 nm or less, preferably 1-50 nm. The median size is measured by a dynamic light scattering method.

(2) Preparation of Second Acidic Sol

Alkoxysilane is hydrolyzed and polymerized in a solvent in the presence of an acid catalyst to prepare a second acidic sol. The solvent and the acid catalyst may be the same as described above. The alkoxysilane may be bifunctional to tetrafunctional alkoxysilane. Tetraalkoxysilane may be the same as described above. The alkoxysilane may be in the form of a monomer or an oligomer. Bifunctional and trifunctional alkoxysilane monomers are expressed by the formula: $Si(OR^1)_x(R^2)_{4-x}$, wherein x is 2 or 3. $R^1$ in the formula is preferably an alkyl group having 1-5 carbon atoms or an acyl group having 1-4 carbon atoms, which may be the same as described above. $R^2$ is preferably an organic group having 1-10 carbon atoms; for instance, unsubstituted hydrocarbon groups such as methyl, ethyl, n-propyl, i-propyl, n-butyl, tert-butyl, n-hexyl, cyclohexyl, n-octyl, tert-octyl, n-decyl, phenyl, vinyl, allyl, etc., and substituted hydrocarbon groups such as γ-chloropropyl, $CF_3CH_2$—, $CF_3CH_2CH_2$—, $C_2F_5CH_2CH_2$—, $C_3F_7CH_2CH_2CH_2$—, $CF_3OCH_2CH_2$—, $C_2F_5OCH_2CH_2CH_2$—, $C_3F_7OCH_2CH_2CH_2$—, $(CF_3)_2CHOCH_2CH_2$—, $C_4F_9CH_2OCH_2CH_2CH_2$—, 3-(perfluorocyclohexyloxy)propyl, $H(CF_2)_4CH_2OCH_2CH_2CH_2$—, $H(CF_2)_4CH_2CH_2CH_2$—, γ-glycidoxypropyl, γ-mercaptopropyl, 3,4-epoxycyclohexylethyl, γ-methacryloyloxypropyl, etc.

Specific examples of bifunctional alkoxysilane monomers include dimethyldialkoxysilane such as dimethyldimethoxysilane, dimethyldiethoxysilane, etc. Specific examples of trifunctional alkoxysilane monomers include methyltrialkoxysilane such as methyltrimethoxysilane, methyltriethoxysilane, etc., and phenyltrialkoxysilane such as phenyltriethoxysilane, etc.

The alkoxysilane is preferably trifunctional or more alkoxysilane, more preferably tetraalkoxysilane. Tetraalkoxysilane is preferably methyltrialkoxysilane and tetraalkoxysilane. The alkoxysilane oligomers are preferably polycondensates of any one of the above bifunctional to tetrafunctional monomers or their mixtures, more preferably polycondensates of tetraalkoxysilane and polycondensates (silsesquioxane) of trifunctional alkoxysilane.

The alkoxysilane is dissolved in a solvent. The solvent/alkoxysilane molar ratio may be the same as described above. An acid catalyst and water are added to the alkoxysilane solution. The molar ratio of the acid catalyst to alkoxysilane is preferably $1\times10^{-4}$ to 1, more preferably $1\times10^{-4}$ to $3\times10^{-2}$, most preferably $3\times10^{-4}$ to $1\times10^{-2}$. The water/alkoxysilane molar ratio may be the same as described above.

The acidic solution containing alkoxysilane is aged for about 30 minutes to about 60 hours. Specifically, the solution is left to stand or slowly stirred at 10-90° C. The polymerization proceeds by aging to form a sol containing silicon oxide. When the aging time is longer than 60 hours, the sol has too large a median size.

The second acidic sol thus obtained has a relatively small median size. Specifically, the median size of the second acidic sol is 10 nm or less, preferably 1-5 nm. The median size ratio of the first acidic sol to the second acidic sol is preferably 5-50, more preferably 5-35. When this ratio is less than 10 or more than 50, the anti-reflection coating has low scratch resistance.

(3) Preparation of Mixed Sol

The first and second acidic sols thus obtained are mixed, and slowly stirred at 1-30° C. for about 1 minute to 6 hours. The mixture may be stirred while being heated to a temperature of higher than 30° C. and 80° C. or lower, if necessary.

In the present invention, the first acidic sol is mixed with the second acidic sol obtained with a relatively short polymerization time, so that a sol for an anti-reflection coating having a low refractive index and excellent scratch resistance can be produced with a relatively short synthesis time.

The solid content mass ratio of the first acidic sol to the second acidic sol is preferably 5-90, more preferably 5-80. When this ratio is less than 5 or more than 90, the anti-reflection coating has low scratch resistance.

(4) Coating

The mixed sol is applied to a substrate by a spin-coating method, a spray-coating method, a dip-coating method, a flow-coating method, a bar-coating method, a reverse-coating method, a flexographic printing method, a printing method, or a combination thereof. Among them, the spin-coating method and the spray-coating method are preferable because they can form a layer with uniform thickness. The physical thickness of the resultant gel coating can be controlled by adjusting, for instance, a substrate-rotating speed in the spin-coating method, the concentration of the mixed sol, etc. The substrate-rotating speed in the spin-coating method is preferably about 1,000-15,000 rpm.

To adjust the concentration and fluidity of the mixed sol in a proper range, the above solvent may be added as a dispersing medium before coating. The mass ratio of silicon oxide to the solvent is preferably 0.1-20%. Outside this mass ratio range, it is difficult to form a uniformly thin coating.

The mixed sol may be subjected to an ultrasonic treatment, if necessary, to reduce the aggregation of colloidal particles. The ultrasonic treatment may be conducted using an ultrasonic dispersion apparatus. Ultrasonic irradiation is preferably conducted at a frequency of 10-30 kHz and power of 300-900 W. The ultrasonic treatment time is preferably 5-120 minutes.

(5) Drying

The solvent is evaporated from the coated mixed sol to form a silica aerogel coating. The conditions of drying the coating are not particularly restricted, but may be properly selected depending on the heat resistance of a substrate, etc. Because the above solvent is volatile, it may be spontaneously dried, but it is preferable that the coating is heat-treated at the boiling point of the solvent ±20° C. for 15 minutes to 24 hours, and then dried at a temperature of 100-200° C. for 15 minutes to 24 hours. However, the upper limit of the heat treatment temperature is preferably the glass transition temperature of the substrate, more preferably the glass transition temperature −100° C. When the heat treatment temperature is higher than the glass transition temperature of the substrate, the substrate is deformed. Because bonding between the silica-aerogel-forming particles is strengthened by the heat treatment, the coating has improved scratch resistance.

(6) Alkali Treatment

The silica aerogel coating is treated with an alkali to improve the scratch resistance of the coating. The usable alkalis include inorganic alkalis such as sodium hydroxide, potassium hydroxide, ammonia, etc.; inorganic alkali salts such as sodium carbonate, sodium hydrogen carbonate, ammonium carbonate, ammonium hydrogen carbonate, etc.; organic alkalis such as monomethylamine, dimethylamine, trimethylamine, monoethylamine, diethyl amine, triethyl amine, n-propyl amine, di-n-propyl amine, n-butyl amine, di-n-butyl amine, n-amylamine, n-hexylamine, laurylamine, ethylenediamine, hexamethylenediamine, aniline, methylaniline, ethylaniline, cyclohexylamine, dicyclohexylamine, pyrrolidine, pyridine, imidazole, guanidine, tetramethylammonium hydroxide, tetraethylammonium hydroxide, tetrabutylammonium hydroxide, monoethanolamine, diethanolamine, triethanolamine, choline, etc.; alkali salts of organic acids such as ammonium formate, ammonium acetate, monomethylamine formate, dimethylamine acetate, aniline acetate, pyridine lactate, guanidine acetate, etc.

The alkali treatment is preferably conducted with a solution of the above alkali. The solvent may be water, alcohols, etc., and properly selected depending on the alkali used. The concentration of the alkali solution is preferably $1 \times 10^{-4}$ N to 20 N, more preferably $1 \times 10^{-3}$ N to 15 N.

The alkali solution is applied to the silica aerogel coating, preferably in an amount of 10-200 mL per 1 $cm^2$ of the silica aerogel coating. The application method may be the same as described above, though the spin-coating method is preferable. The substrate-rotating speed in the spin-coating method is preferably about 1,000-15,000 rpm.

The treatment temperature of the silica aerogel coating with the alkali solution is preferably 1-40° C., more preferably 10-30° C. The treatment time of the silica aerogel coating with the alkali solution is preferably 0.1-10 hours, more preferably 0.2-1 hour.

When the silica aerogel coating is treated with ammonia, the silica aerogel coating may be brought into contact with an ammonia gas. The pressure of the ammonia gas is preferably $1 \times 10^{-1}$ Pa to $1 \times 10^5$ Pa. The treatment temperature of the silica aerogel coating with the ammonia gas is preferably 1-40° C., more preferably 10-30° C. The treatment time of the silica aerogel coating with the ammonia gas is preferably 1-170 hours, more preferably 5-80 hours.

(7) Drying

The alkali-treated silica aerogel coating is dried, preferably at a temperature of 100-200° C. for 15 minutes to 24 hours.

(8) Washing

The alkali-treated silica aerogel coating may be washed before and/or after drying, if necessary. The washing is conducted by a water immersion method, a water-showering method, or a combination thereof. In the case of immersion in water, an ultrasonic treatment may be conducted. The washing temperature is preferably in a range of 1° C. to 40° C. The washing time is preferably 0.2-15 minutes. The amount of water used per 1 $cm^2$ of the alkali-treated silica aerogel coating is preferably 0.01-1,000 mL. When washed after drying, drying is conducted again under the above conditions.

(9) Formation of Dense Coating

The above silica aerogel coating may be formed on the dense coating formed on the substrate, and then treated with an alkali to form a multilayer anti-reflection coating. The dense coating may be a layer of an inorganic material such as metal oxide (hereinafter referred to as "inorganic layer"), a composite layer of fine inorganic particles and a binder (hereinafter referred to as "fine inorganic particles-binder composite layer" or simply "composite layer"), or a resin layer. Materials for the dense coating are selected from those having refractive indices smaller than that of the substrate and larger than that of the alkali-treated silica aerogel coating.

Specific examples of the inorganic materials usable for the inorganic layer include magnesium fluoride, calcium fluoride, aluminum fluoride, lithium fluoride, sodium fluoride, cerium fluoride, silicon oxide, aluminum oxide, zirconium oxide, cryolite, chiolite, titanium oxide, cerium oxide, silicon nitride, and these mixtures.

Specific examples of the fine inorganic particles usable for the composite layer include fine particles of at least one inorganic material selected from the group consisting of calcium fluoride, magnesium fluoride, aluminum fluoride, sodium fluoride, lithium fluoride, cerium fluoride, silicon oxide, aluminum oxide, zirconium oxide, cryolite, chiolite, titanium oxide, indium oxide, tin oxide, antimony oxide, cerium oxide, hafnium oxide and zinc oxide. The silicon oxide is preferably colloidal silica, which may be surface-treated with a silane coupling agent, etc. The refractive index of the fine inorganic particles-binder composite layer depends on the composition and percentage of the fine inorganic particles, and the composition of the binder.

Specific examples of the resin layer include a fluororesin layer, an epoxy resin layer, an acrylic resin layer, a silicone resin layer and a urethane resin layer. Specific examples of the fluororesins include crystalline fluororesins such as polytetrafluoroethylene, perfluoroethylene propylene copolymers, perfluoroalkoxy resins, polyvinylidene fluoride, ethylene-tetrafluoroethylene copolymers and polychlorotrifluoroethylene, and amorphous fluororesins such as fluoroolefin copolymers, fluorine-containing alicyclic polymers, fluorinated acrylate copolymers, and the amorphous fluororesins are more preferable because of excellent transparency. A preferred example of the fluoroolefin copolymers is a copolymer comprising 37-48% by mass of tetrafluoroethylene, 15-35% by mass of vinylidene fluoride, and 26-44% by mass of hexafluoropropylene. The fluorine-containing alicyclic polymers may be obtained by polymerizing fluorine-containing alicyclic monomers, or the ring-closure polymerization of fluorine-containing monomers having at least two polymerizable double bonds.

The dense coating may be multilayer. A multilayer dense coating may be formed by any one of the above inorganic layer, composite layer and resin layer. When the multilayer dense coating is a laminate of inorganic layers, inorganic materials may be magnesium fluoride, silicon oxide, aluminum oxide, zirconium oxide, titanium oxide, cerium oxide, silicon nitride, etc.

The inorganic layer can be formed by physical vapor deposition such as vacuum vapor deposition, sputtering, ion plating, etc., or chemical vapor deposition such as thermal CVD, plasma CVD, optical CVD, etc., and the vacuum vapor deposition is preferable. The fine inorganic particles-binder composite layer can be formed by a wet method such as a dip-coating method, a spin-coating method, a spray-coating method, a roll-coating method, a screen-printing method, etc., and the dip-coating method is preferable. The resin layer can be formed by a chemical vapor deposition method or a wet method. A vapor deposition method for forming an inorganic layer, and a dip-coating method for forming a fine inorganic particles-binder composite layer and a fluororesin layer are described in JP 2006-215542 A.

[2] Anti-Reflection Coating

The anti-reflection coating formed by the above method is an alkali-treated silica aerogel coating, or a multilayer coating comprising an alkali-treated silica aerogel coating and a single-layer or multilayer dense coating. The physical thickness of the alkali-treated silica aerogel coating is preferably 15-500 nm, more preferably 70-170 nm. The physical thickness of the alkali-treated silica aerogel coating can be properly adjusted by the concentration of the mixed sol, the number of coating steps, etc.

The alkali-treated silica aerogel coating is a porous coating uniformly having nanometer-size pores and a skeleton having Si—O bonds. Such an alkali-treated silica aerogel coating has high transparency. The refractive index of the alkali-treated silica aerogel coating becomes smaller as its porosity increases. The alkali-treated silica aerogel coating preferably has a porosity of 30-90%, and the alkali-treated silica aerogel coating having a porosity of 30-90% usually has a refractive index of 1.05-1.35. For instance, the alkali-treated silica aerogel coating having a porosity of 78% has a refractive index of about 1.1. When the porosity is more than 90%, the alkali-treated silica aerogel coating has too low mechanical strength. When the porosity is less than 30%, the refractive index is too large. The refractive index is measured using a lens reflectance meter.

The alkali-treated silica aerogel coating has a structure in which relatively small silica particles formed from the second acidic sol exist in gaps among relatively large silica particles formed from First acidic sol, unreacted silanol groups in the silica aerogel coating being condensed by the alkali treatment to increase Si—O—Si bonds, thereby having excellent scratch resistance.

When the anti-reflection coating is a two-layer coating comprising the alkali-treated silica aerogel coating and the single-layer dense coating, a refractive index preferably decreases successively from the substrate to the dense coating, to the alkali-treated silica aerogel coating and to an incident medium. The dense coating and the alkali-treated silica aerogel coating preferably have optical thicknesses $d_1$ and $d_2$ in a range of $\lambda d/5$ to $\lambda d/3$, wherein $\lambda d$ is a designed wavelength. The optical thickness of a layer is a product of the refractive index and physical thickness of the layer. The designed wavelength $\lambda d$ used for determining the structure of a coating can be properly determined depending on wavelength used for an optical element, but it is preferably substantially a center wavelength, for instance, of a visible wavelength range of 380-780 nm according to CIE (Commission Internationale de l'Eclairage).

In the anti-reflection coating comprising a dense coating and an alkali-treated silica aerogel coating having a refractive index decreasing stepwise from the substrate, in which the optical thicknesses $d_1$ and $d_2$ of the dense coating and the alkali-treated silica aerogel coating are in a range of $\lambda d/5$ to $\lambda d/3$, wherein $\lambda d$ is a designed wavelength, the optical thickness $(d_1+d_2)$ of the anti-reflection coating is in a range of $2\lambda d/5$ to $2\lambda d/3$, and the refractive index changes smoothly and stepwise relative to the optical thickness from the substrate to the incident medium. When the optical thickness of the anti-reflection coating is in a range of $2\lambda d/5$ to $2\lambda d/3$, the light path difference between light rays reflected by a surface of the anti-reflection coating and light rays reflected by an interface between the anti-reflection coating and the substrate is substantially ½ of the designed wavelength $\lambda d$, so that these light rays are canceled by interference. With smooth and stepwise change of the refractive index with the optical thickness from the substrate to the incident medium, the reflection of incident light at each interface can be reduced in a wide wavelength range. Further, light rays reflected at each interface are canceled by light rays entering each layer by interference. Accordingly, the anti-reflection coating has excellent anti-reflection performance to light rays in wide wavelength and incident angle ranges. If the optical thicknesses of the dense coating and the alkali-treated silica aerogel coating were not in a range of $\lambda d/5$ to $\lambda d/3$, there would be no smooth change of a refractive index relative to the optical thickness from the substrate to the incident medium, resulting in large reflectance at an interface between the dense coating and the alkali-treated silica aerogel coating. Each optical thickness $d_1$, $d_2$ of the dense coating and the alkali-treated silica aerogel coating is more preferably $\lambda d/4.5$ to $\lambda d/3.5$.

The refractive index differences between the substrate and the dense coating, between the dense coating and the alkali-treated silica aerogel coating, and between the alkali-treated silica aerogel coating and the incident medium are preferably 0.02-0.4, such that the change of the refractive index with the optical thickness is so smooth that it can be approximated substantially by a straight line. Thus, the anti-reflection coating has an improved anti-reflection effect.

When the anti-reflection coating comprises an alkali-treated silica aerogel coating and a multilayer dense coating, the multilayer dense coating is preferably designed such that light rays reflected at each interface and those entering each layer are canceled by interference. Specifically, anti-reflection efficiency can be increased by properly combining pluralities of layers having different refractive indices.

[3] Optical Element

The optical element of the present invention comprises the above anti-reflection coating on an optical substrate. Materials for the optical substrate may be glass, crystalline materials and plastics. Specific examples of materials for the optical substrate may be optical glass such as BK7, LASF01, LASF016, LaFK55, LAK14 and SF5, PYREX (registered trademark), quartz, soda lime glass, white crown glass, polymethyl methacrylate (PMMA), polycarbonates (PC), linear or cyclic polyolefins, etc. The refractive indices of these materials are in a range of 1.45-1.85. The optical substrate may be in a shape of a flat plate, a lens, a prism, a light guide, a film, a diffraction element, etc.

Figure 1B:
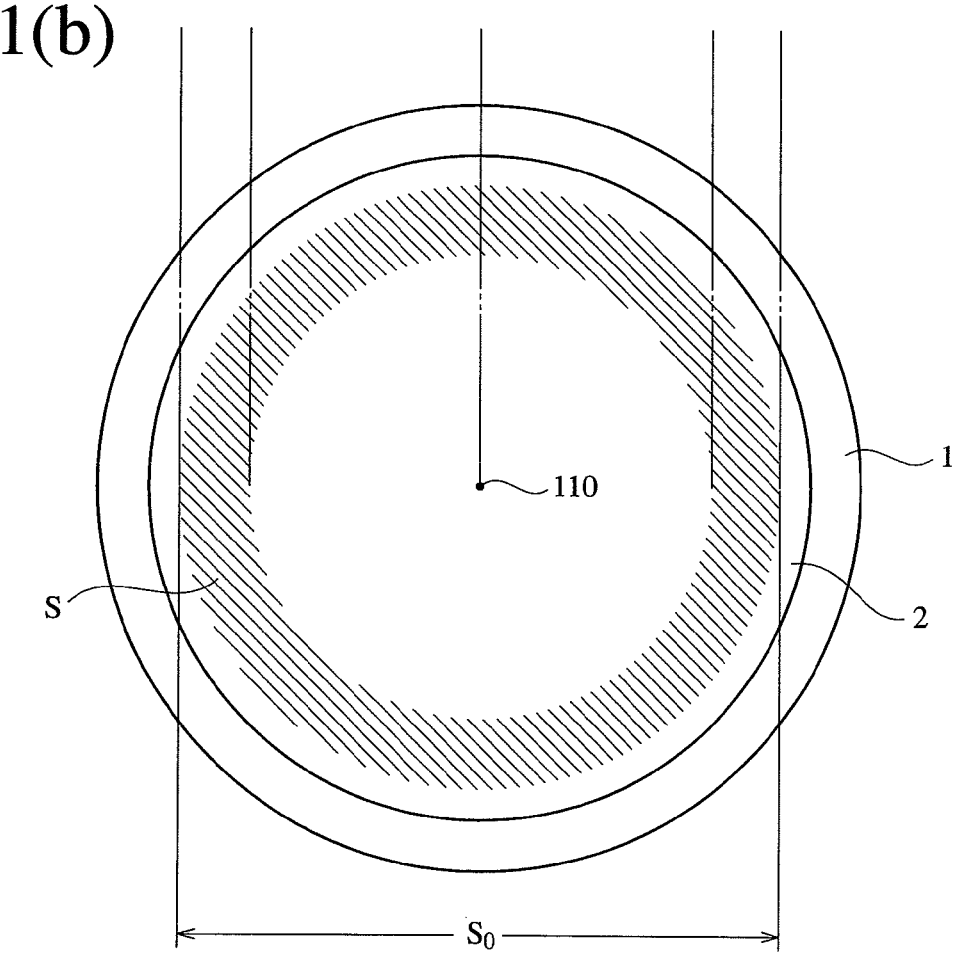
FIG. 1(b) is a plan view showing one example of the optical elements of the present invention.

FIG. 1 shows one example of the optical elements of the present invention. This optical element comprises a lens 1 having a convex surface 11 and an anti-reflection coating 2 formed on the convex surface 11. The optical element has a concave surface 12 on the rear side. The anti-reflection coating 2 is formed only on the convex surface 11 of the lens 1 in this example, but it may be formed on both convex surface 11 and concave surface 12. Those having rings on a convex surface 11 and/or a concave surface 12 for causing diffraction are also within the scope of the present invention. For clarity, the thickness of the anti-reflection coating 2 is exaggerated in the figure.

Figure 2:
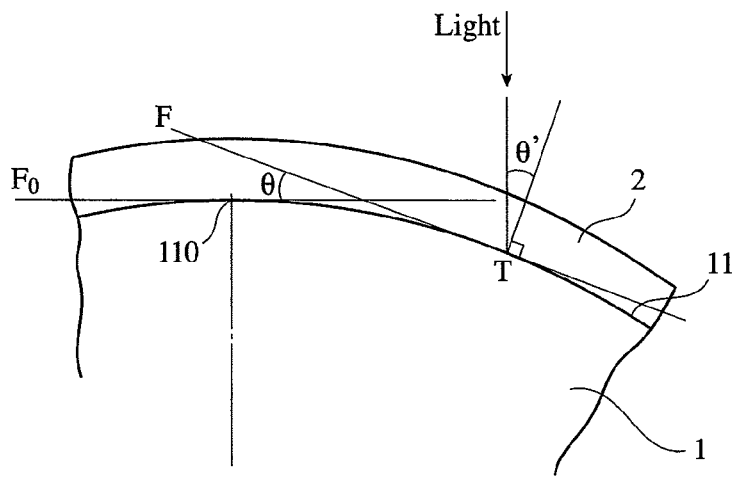
FIG. 2 is a partially enlarged cross-sectional view showing the optical element of FIG. 1.
Figure 3:
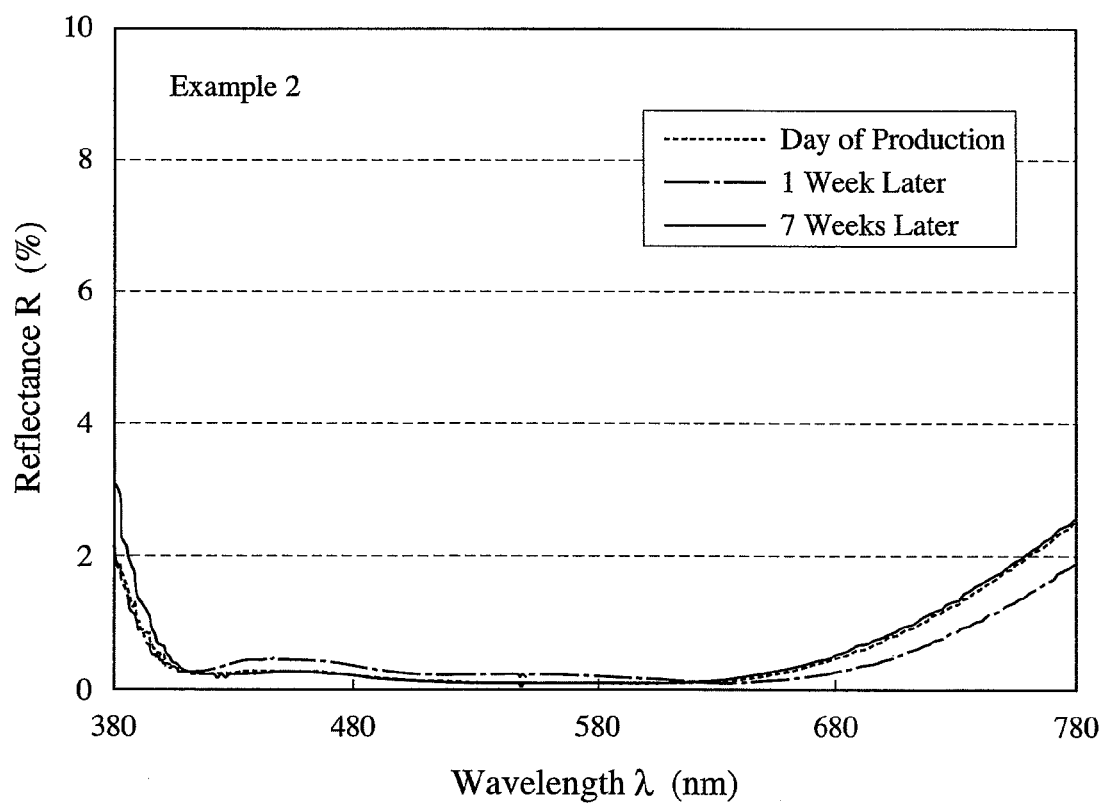
FIG. 3 is a graph showing the spectral reflectance of the anti-reflection coating of Example 2.
Figure 4:
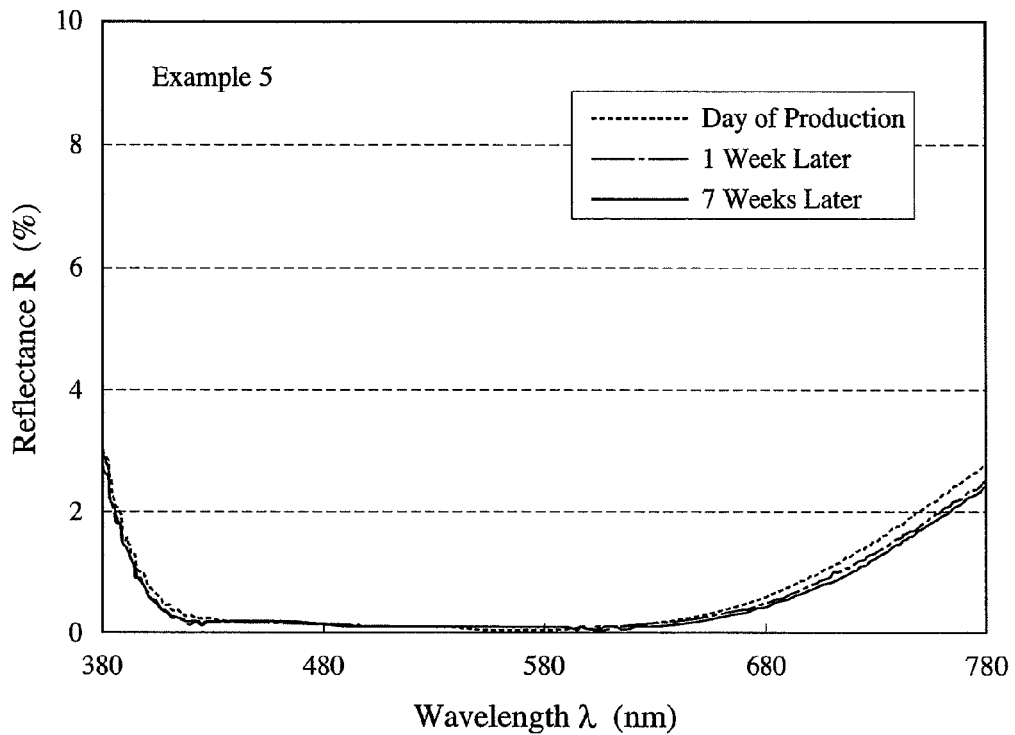
FIG. 4 is a graph showing the spectral reflectance of the anti-reflection coating of Example 5.
Figure 5:
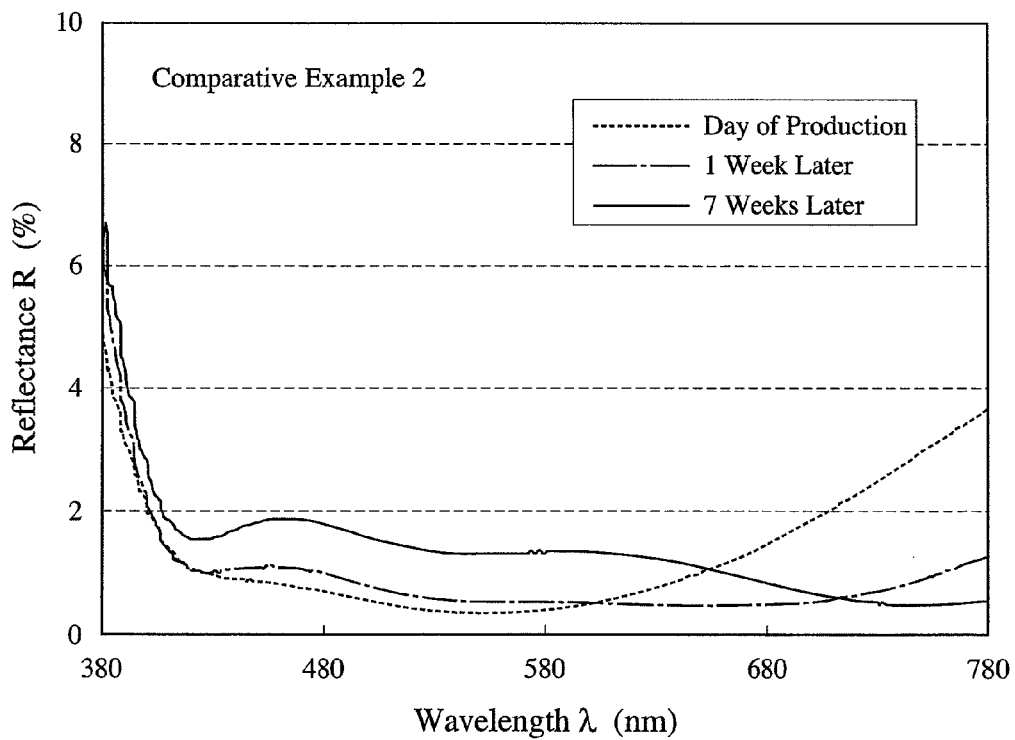
FIG. 5 is a graph showing the spectral reflectance of the anti-reflection coating of Comparative Example 2.
Figure 6:
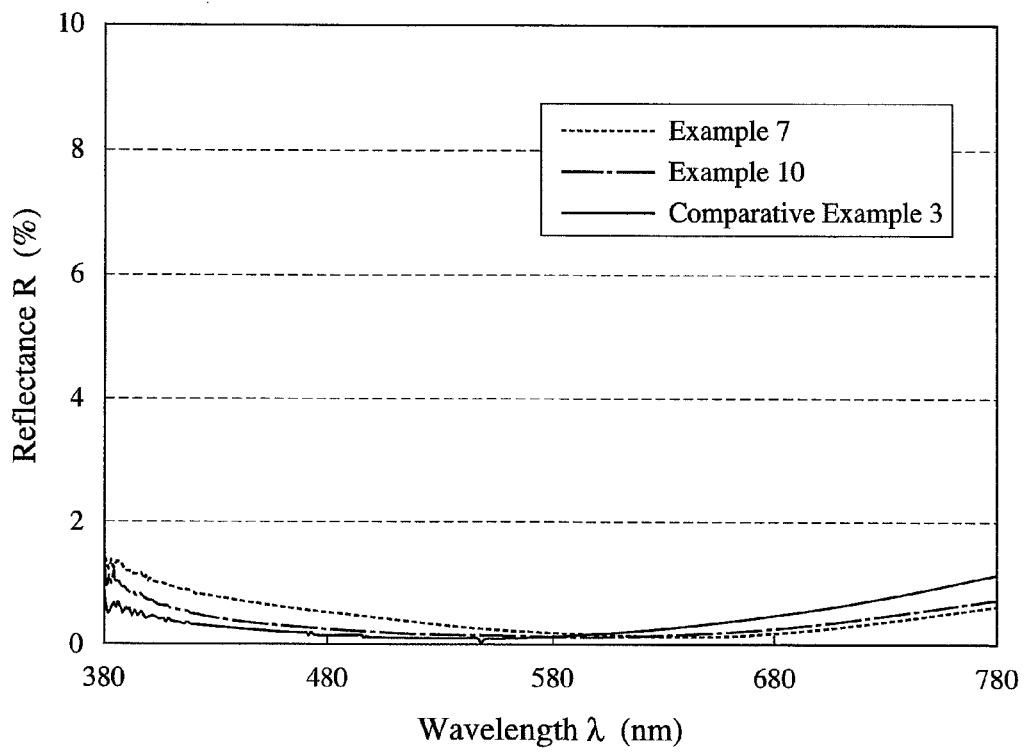
FIG. 6 is a graph showing the spectral reflectance of the anti-reflection coatings of Examples 7 and 10 and Comparative Example 3.

As shown in FIG. 1($b$), a projected area S of a portion having a surface inclination angle θ of 50° or more in an effective region E of the lens 1 is 10% or more of a projected area $S_0$ of the effective region E. In such a lens, the maximum surface inclination angle $\theta_{max}$ in the effective region E is usually 60° to 75°. As shown in FIG. 2, a surface inclination angle θ at an arbitrary point T on the convex surface 11 of the lens 1 is defined as an angle between a surface Fo tangent to a center 110 of the convex surface 11 and a surface F tangent to the point T. A lens having a maximum surface inclination angle $\theta_{max}$ of 60° to 75° is suitable for an objective lens in apparatuses for recording and regenerating light information, etc. When incident light is parallel light like laser rays, an incident light angle θ' of the optical element is equal to the surface inclination angle θ.

The lens 1 preferably has a refractive index of 1.45-1.85. When the refractive index is less than 1.45, it is difficult to achieve high NA. When the refractive index is more than 1.85, it absorbs light in a wavelength range from an ultraviolet region to a blue region, not suitable for laser rays having a wavelength of 405 nm.

A ratio $D/D_0$, wherein D represents the physical thickness of the anti-reflection coating 2 in a peripheral portion of the lens 1, and $D_0$ represents the physical thickness of the anti-reflection coating 2 at a center of the lens 1, is preferably cos $\theta^{0.7}$ to $\cos(\sin^{-1}(\sin\theta/n))^{-1}$, wherein θ represents a surface inclination angle of the anti-reflection coating 2, and n represents the refractive index of the anti-reflection coating 2. The peripheral portion of the lens 1 is a portion in which the surface inclination angle θ is 50° or more. Although the physical thickness of the anti-reflection coating 2 gradually decreases from the center of the lens to the peripheral portion, its decrease is relatively small. Accordingly, such design as having the optimum thickness at the lens center does not provide the anti-reflection coating 2 with too small thickness in the peripheral portion, resulting in good anti-reflection performance. When the anti-reflection coating 2 does not have uniform physical thickness in the peripheral portion of the lens 1, the physical thickness D may be any one of the maximum thickness, the minimum thickness and an average thickness.

Such optical element has high anti-reflection characteristics in an effective lens region to light in a wide wavelength range from a visible region to an infrared region. Specifically, it has spectral reflectance of usually 10% or less, preferably 5% or less, to visible light (wavelength: 380-780 nm) in an incident angle range of 0° to 70°. Optical elements having such properties are suitable as lenses for apparatuses for recording and regenerating light information, steppers, cameras, endoscopes, light-transmitting parts such as laser diode (LD) modules, optical couplers and optical branching filters, etc. The optical element of the present invention can be used as a pickup lens to light having various wavelengths for media for recording and regenerating light information, such as CDs, DVDs, Blu-ray Disks, HD-DVDs, etc. The shape of the optical element of the present invention may be properly selected depending on its applications. When used as a pickup lens for apparatuses for recording and regenerating light information, the optical element usually has a shape as shown in FIG. 1. When used for endoscopes and light-transmitting parts, the optical element usually has a ball shape.

The present invention will be explained in further detail by Examples below without intention of restricting the present invention thereto.

Example 1

(1) Preparation of First Acidic Sol (a) Hydrolysis and Polymerization with Basic Catalyst 17.05 g of tetraethoxysilane was mixed with 69.13 g of methanol and then with 3.88 g of ammonia water (3 N), and stirred at room temperature for 15 hours to prepare an alkaline sol.

(b) Hydrolysis and Polymerization with Acid Catalyst 40.01 g of the alkaline sol was mixed with 2.50 g of methanol and 1.71 g of hydrochloric acid (12 N), and stirred at room temperature for 30 minutes to prepare a first acidic sol (solid content: 4.94% by mass).

(2) Preparation of Second Acidic Sol 30 mL of tetraethoxysilane was mixed with 30 mL of ethanol at room temperature, and then with 2.4 mL of water. With 0.1 mL of hydrochloric acid (1 N) added, the resultant mixture was stirred at 60° C. for 90 minutes to prepare a second acidic sol (solid content: 14.8% by mass).

(3) Measurement of Median Size

Measurement by a dynamic light scattering method using a dynamic light-scattering particle size distribution meter (LB-550 available from Horiba, Ltd.) revealed that the median sizes of the first and second acidic sols were 16.0 nm and 1.8 nm, respectively.

(4) Preparation of Mixed Sol 0.22 g of the second acidic sol was added to the total amount of the first acidic sol at a solid content mass ratio (first acidic sol/second acidic sol) of 67.1, and stirred at room temperature for 5 minutes to prepare a mixed sol (I). The preparation conditions of the mixed sol (I) are shown in Table 1.

TABLE 1

| Preparation conditions of mixed sol (I) | |
|---|---|
| First Acidic Sol | |
| In the Presence of Base Catalyst | |
| TEOS[1] (g) | 17.05 |
| Methanol (g) | 69.13 |
| NH$_3$ Water[2] (g) | 3.88 |
| Hydrolysis | RT[3]/15 hours |
| In the Presence of Acid Catalyst | |
| Alkaline Sol (g) | 40.01 |
| Additional Methanol (g) | 2.50 |
| Hydrochloric Acid[4] (g) | 1.71 |
| Hydrolysis | RT/30 min. |
| Median Size (nm) | 16.0 |
| Second Acidic Sol | |
| TEOS (mL) | 30 |
| Ethanol (mL) | 30 |
| Water (mL) | 2.4 |
| Hydrochloric Acid[5] (mL) | 0.1 |
| Hydrolysis | 60° C./90 min. |
| Median Size (nm) | 1.8 |
| Mixed Sol | |
| First Acidic Sol (g) | 44.22 |
| Second Acidic Sol (g) | 0.22 |
| Solid Content Mass Ratio[6] | 67.1 |
| Median Size Ratio[7] | 8.9 |

Note:
[1] TEOS represents tetraethoxysilane.
[2] 3 N.
[3] RT represents room temperature.
[4] 12 N.
[5] 1 N.
[6] The mass ratio (on a solid content basis) of the first acidic sol to the second acidic sol.
[7] The median size ratio of the first acidic sol to the second acidic sol.

(5) Formation of Multilayer, Dense Coating

Using an electron beam vapor deposition apparatus, a six-layer, dense coating having the structure shown in Table 4 was formed on a flat plate of LASF01 glass (diameter 30 mm, refractive index 1.79) by a vacuum vapor deposition method. Used in the measurement of a refractive index and a physical thickness was a lens reflectance meter (USPM-RU available from Olympus Corporation).

(6) Formation of Silica Aerogel Coating

The mixed sol (I) was spin-coated onto the six-layer, dense coating, and heat-treated at 80° C. for 30 minutes and at 160° C. for 30 minutes to form a silica aerogel coating having a physical thickness of 97 nm.

(7) Alkali Treatment 400 mL of a 0.001-N aqueous sodium hydroxide solution was spin-coated onto the silica aerogel coating, left to stand at room temperature for 30 minutes, and dried at 120° C. for 30 minutes to form an anti-reflection coating.

Example 2

An anti-reflection coating was formed in the same manner as in Example 1 except for using a 0.01-N aqueous sodium hydroxide solution.

Example 3

An anti-reflection coating was formed in the same manner as in Example 1 except for using a 0.1-N aqueous sodium hydroxide solution.

Example 4

An anti-reflection coating was formed in the same manner as in Example 1, except that a flat plate of LASF01 glass on which the six-layer, dense coating and the silica aerogel coating were formed, and 50 mL of 28-%-by-mass ammonia water were kept in a desiccator without direct contact at room temperature for 6 hours, to conduct the alkali treatment of the silica aerogel coating with an ammonia gas.

Example 5

An anti-reflection coating was formed in the same manner as in Example 4 except for changing the ammonia gas treatment time to 72 hours.

Example 6

A dense alumina coating having a refractive index of 1.64 and a physical thickness of 71 nm (optical thickness: 116 nm) was formed on a flat plate of LASF01 glass by a vacuum vapor deposition method. Formed on this dense alumina coating was the same silica aerogel coating as in Example 1, onto which 400 mL of a 0.001-N aqueous sodium hydroxide solution was spin-coated. After left to stand at room temperature for 30 minutes, it was dried at 120° C. for 30 minutes to form an anti-reflection coating.

Example 7

An anti-reflection coating was formed in the same manner as in Example 6 except for using a 0.01-N aqueous sodium hydroxide solution.

Example 8

An anti-reflection coating was formed in the same manner as in Example 6 except for using a 0.1-N aqueous sodium hydroxide solution.

Example 9

An anti-reflection coating was formed in the same manner as in Example 6, except that a flat plate of LASF01 glass on which the dense alumina coating and the silica aerogel coating were formed, and 50 mL of 28-%-by-mass ammonia water were kept in a desiccator without direct contact at room temperature for 6 hours, to conduct the alkali treatment of the silica aerogel coating with an ammonia gas.

Example 10

An anti-reflection coating was formed in the same manner as in Example 9 except for changing the ammonia gas treatment time to 72 hours.

Example 11

A first acidic sol was prepared in the same manner as in Example 1. After 30 mL of methyltriethoxysilane, 30 mL of methanol and 2.4 mL of water were mixed at room temperature, 0.1 mL of hydrochloric acid (1 N) was added thereto. The resultant mixture was stirred at 60° C. for 90 minutes to prepare a second acidic sol (solid content: 14.8% by mass). The first and second acidic sols had a median size of 16.1 nm and 1.1 nm, respectively. 2.22 g of the second acidic sol was added to the total amount of the first acidic sol at a mass ratio (first acidic sol/second acidic sol) of 6.7 on a solid content basis, and stirred at room temperature for 5 minutes to prepare a mixed sol (II). The preparation conditions of the mixed sol (II) are shown in Table 2.

TABLE 2

| Preparation conditions of mixed sol (II) | |
|---|---|
| First Acidic Sol | |
| In the Presence of Base Catalyst | |
| TEOS[1] (g) | 17.05 |
| Methanol (g) | 69.13 |
| NH$_3$ Water[2] (g) | 3.88 |
| Hydrolysis | RT[3]/15 hours |
| In the Presence of Acid Catalyst | |
| Alkaline Sol (g) | 40.01 |
| Additional Methanol (g) | 2.50 |
| Hydrochloric Acid[4] (g) | 1.71 |
| Hydrolysis | RT/30 min. |
| Median Size (nm) | 16.1 |
| Second Acidic Sol | |
| MTEOS[5] (mL) | 30 |
| Methanol (mL) | 30 |
| Water (mL) | 2.4 |
| Hydrochloric Acid[6] (mL) | 0.1 |
| Hydrolysis | 60° C./90 min. |
| Median Size (nm) | 1.1 |
| Mixed Sol | |
| First Acidic Sol (g) | 44.22 |
| Second Acidic Sol (g) | 2.22 |
| Solid Content Mass Ratio[7] | 6.7 |
| Median Size Ratio[8] | 14.6 |

Note:
[1]TEOS represents tetraethoxysilane.
[2]3 N.
[3]RT represents room temperature.
[4]12 N.
[5]MTEOS represents methyltriethoxysilane.
[6]1 N.
[7]The mass ratio (on a solid content basis) of the first acidic sol to the second acidic sol.
[8]The median size ratio of the first acidic sol to the second acidic sol.

A silica aerogel coating was formed in the same manner as in Example 1, except that the mixed sol (II) was spin-coated onto a flat plate of BK7 glass (diameter 30 mm, refractive index 1.52) without a dense coating. 400 mL of a 0.001-N aqueous sodium hydroxide solution was spin-coated onto the silica aerogel coating, left to stand at room temperature for 30 minutes, and dried at 120° C. for 30 minutes to form an anti-reflection coating.

Example 12

An anti-reflection coating was formed in the same manner as in Example 11 except for using a 0.01-N aqueous sodium hydroxide solution.

Example 13

An anti-reflection coating was formed in the same manner as in Example 11 except for using a 0.1-N aqueous sodium hydroxide solution.

Example 14

An anti-reflection coating was formed in the same manner as in Example 11, except that a flat plate of BK7 glass on which the silica aerogel coating was formed, and 50 mL of 28-%-by-mass ammonia water were kept in a desiccator without direct contact at room temperature for 6 hours, to conduct the alkali treatment of the silica aerogel coating with an ammonia gas.

Example 15

An anti-reflection coating was formed in the same manner as in Example 14 except for changing the ammonia gas treatment time to 72 hours.

Example 16

An anti-reflection coating was formed in the same manner as in Example 1, except that after the aqueous sodium hydroxide solution was spin-coated onto the silica aerogel coating and left to stand for 30 minutes, the glass plate was immersed in 100 mL of water at room temperature for 15 minutes for washing, and then dried at 120° C. for 30 minutes.

Example 17

An anti-reflection coating was formed in the same manner as in Example 6, except that after the aqueous sodium hydroxide solution was spin-coated onto the silica aerogel coating and left to stand 30 minutes, the glass plate was immersed in 100 mL of water at room temperature for 15 minutes for washing, and then dried at 120° C. for 30 minutes.

Example 18

An anti-reflection coating was formed in the same manner as in Example 1 except for using 28-%-by-mass ammonia water (15 N) in place of the aqueous sodium hydroxide solution.

Example 19

An anti-reflection coating was formed in the same manner as in Example 18, except that after the ammonia water was spin-coated onto the silica aerogel coating and left to stand at room temperature for 30 minutes, the glass plate was immersed in 100 mL of water at room temperature for 15 minutes for washing, and then dried at 120° C. for 30 minutes.

Example 20

An anti-reflection coating was formed in the same manner as in Example 1 except for using a 0.25-%-by-mass (0.0238-N) solution of tetraethyl ammonium hydroxide in methanol in place of the aqueous sodium hydroxide solution.

Example 21

An anti-reflection coating was formed in the same manner as in Example 20, except that after the solution of tetraethyl ammonium hydroxide in methanol was spin-coated onto the silica aerogel coating and at left to stand at 15-30° C. for 30 minutes, the glass plate was immersed in 100 mL of water at room temperature for 15 minutes for washing, and then dried at 120° C. for 30 minutes.

Comparative Example 1

An anti-reflection coating was formed in the same manner as in Example 1, except that a treatment with an aqueous sodium hydroxide solution was not conducted on a silica aerogel coating having a physical thickness of 100 nm, which was formed by spin-coating the mixed sol (I) onto a flat plate of BK7 glass (refractive index 1.52), and heat-treating it at 80° C. for 30 minutes and at 160° C. for 30 minutes.

Comparative Example 2

An anti-reflection coating comprising a silica aerogel coating and a multilayer dense coating was formed in the same manner as in Example 1, except that a treatment with an aqueous sodium hydroxide solution was not conducted.

Comparative Example 3

An anti-reflection coating comprising a silica aerogel coating and a multilayer dense coating was formed in the same manner as in Example 6 except that a treatment with an aqueous sodium hydroxide solution was not conducted.

Comparative Example 4

An anti-reflection silica aerogel coating was formed in the same manner as in Example 11 except that a treatment with an aqueous sodium hydroxide solution was not conducted.

Comparative Example 5

(1) Preparation of Organically Modified Silica-Containing Sol 5.21 g of tetraethoxysilane was mixed with 4.38 g of ethanol and then with 0.4 g of hydrochloric acid (0.01 N), and stirred for 90 minutes. With 44.3 g of ethanol and 0.5 g of ammonia water (0.02 N) added, stirring was conducted for 46 hours, and the mixed solution was heated to 60° C. for aging for 46 hours, thereby forming a wet gel. After the solvent was decanted, ethanol was quickly added, and shaking and decantation were conducted to substitute the solvent in the wet gel with ethanol. With methyl isobutyl ketone (MIBK) added, shaking and decantation were further conducted to replace ethanol with MIBK. The resultant gel-like silica was mixed with a solution of trimethylchlorosilane in MIBK (concentration: 5% by volume), and stirred for 20 hours to organically modify terminal silicon oxide groups. The resultant organically modified silica gel was washed with isopropanol (IPA). After IPA was added to the organically modified silica gel to adjust its concentration to 10% by mass, ultrasonic irradiation (20 kHz, 500 W) was conducted for 40 minutes to turn the gel to a sol.

(2) Formation of Organically Modified Porous Silica Aerogel Coating

The above flat plate of BK7 glass was spin-coated with the organically modified silica-containing sol obtained in the step (1), air-dried at room temperature, and heat-treated at 150° C. for 1 hour to form an anti-reflection coating of organically modified porous silica aerogel having a physical thickness of 110 nm.

Comparative Example 6

An anti-reflection coating was formed in the same manner as in Comparative Example 5, except that the organically modified porous silica aerogel coating was spin-coated with 400 mL of a 0.001-N aqueous sodium hydroxide solution, left to stand at room temperature for 30 minutes, and dried at 120° C. for 30 minutes.

Comparative Example 7

An anti-reflection coating was formed in the same manner as in Comparative Example 5, except that the organically modified porous silica aerogel coating was spin-coated with a 0.1-N aqueous sodium hydroxide solution 400 mL, left to stand at room temperature for 30 minutes, and dried at 120° C. for 30 minutes.

Comparative Example 8

An anti-reflection coating was formed in the same manner as in Comparative Example 5, except that a flat plate of BK7 glass provided with the organically modified porous silica aerogel coating, and 50 mL of 28-%-by-mass ammonia water were kept in a desiccator without direct contact at 15-30° C. for 72 hours to conduct the alkali treatment of the organically modified porous silica aerogel coating with an ammonia gas.

The production conditions of the anti-reflection coatings of Examples 1-21 and Comparative Examples 1-8 are shown in Table 3, and their properties measured by methods described below are shown in Table 4.

Elevation of Scratch Resistance

Each anti-reflection coating of Examples 1-21 and Comparative Examples 1-8 was rubbed with a nonwoven fabric (SPICK lens cleaning wiper available from Ozu Corporation) 10 times at a pressure of 1 kgf/cm$^2$ and a speed of 120 times/minute, and the rubbed surface was observed to evaluate scratch resistance according to the following standards:

Excellent: The anti-reflection coating was not scratched at all.
Good: The anti-reflection coating was slightly scratched, but did not peel.
Poor: The anti-reflection coating peeled off.

TABLE 3

Conditions of Forming Anti-Reflection Coating

| No. | Formation of Dense Coating | Sol | Baking Conditions of Sol Coating |
|---|---|---|---|
| Example 1 | Yes[1] | Mixed Sol (I) | 80° C./30 min. + 160° C./30 min. |
| Example 2 | Yes[1] | Mixed Sol (I) | 80° C./30 min + 160° C./30 min. |
| Example 3 | Yes[1] | Mixed Sol (I) | 80° C./30 min. + 160° C./30 min. |
| Example 4 | Yes[1] | Mixed Sol (I) | 80° C./30 min. + 160° C./30 min. |
| Example 5 | Yes[1] | Mixed Sol (I) | 80° C./30 min. + 160° C./30 min. |
| Example 6 | Yes[2] | Mixed Sol (I) | 80° C./30 min. + 160° C./30 min. |
| Example 7 | Yes[2] | Mixed Sol (I) | 80° C./30 min. + 160° C./30 min. |
| Example 8 | Yes[2] | Mixed Sol (I) | 80° C./30 min. + 160° C./30 min. |
| Example 9 | Yes[2] | Mixed Sol (I) | 80° C./30 min. + 160° C./30 min. |
| Example 10 | Yes[2] | Mixed Sol (I) | 80° C./30 min. + 160° C./30 min. |
| Example 11 | No | Mixed Sol (II) | 80° C./30 min. + 160° C./30 min. |
| Example 12 | No | Mixed Sol (II) | 80° C./30 min. + 160° C./30 min. |
| Example 13 | No | Mixed Sol (II) | 80° C./30 min. + 160° C./30 min. |
| Example 14 | No | Mixed Sol (II) | 80° C./30 min. + 160° C./30 min. |
| Example 15 | No | Mixed Sol (II) | 80° C./30 min. + 160° C./30 min. |
| Example 16 | Yes[1] | Mixed Sol (I) | 80° C./30 min. + 160° C./30 min. |
| Example 17 | Yes[2] | Mixed Sol (I) | 80° C./30 min. + 160° C./30 min. |
| Example 18 | Yes[1] | Mixed Sol (I) | 80° C./30 min. + 160° C./30 min. |
| Example 19 | Yes[1] | Mixed Sol (I) | 80° C./30 min. + 160° C./30 min. |
| Example 20 | Yes[1] | Mixed Sol (I) | 80° C./30 min. + 160° C./30 min. |
| Example 21 | Yes[1] | Mixed Sol (I) | 80° C./30 min. + 160° C./30 min. |

| No. | Alkali Treatment Conditions | Drying Conditions | Washing Conditions |
|---|---|---|---|
| Example 1 | Coated with aqueous NaOH solution (0.001 N), and left to stand at RT for 30 min. | 120° C./30 min. | — |
| Example 2 | Coated with aqueous NaOH solution (0.01 N), and left to stand at RT[3] for 30 min. | 120° C./30 min. | — |
| Example 3 | Coated with aqueous NaOH Solution (0.1 N), and left to stand at RT for 30 min. | 120° C./30 min. | — |
| Example 4 | Exposed to NH$_3$ gas at RT for 6 hours | 120° C./30 min. | — |
| Example 5 | Exposed to NH$_3$ gas at RT for 72 hours | 120° C./30 min. | — |
| Example 6 | Coated with aqueous NaOH solution (0.001 N), and left to stand at RT for 30 min. | 120° C./30 min. | — |
| Example 7 | Coated with aqueous NaOH solution (0.01 N), and left to stand at RT for 30 min. | 120° C./30 min. | — |
| Example 8 | Coated with aqueous NaOH solution (0.1 N), and left to stand at RT for 30 min. | 120° C./30 min. | — |
| Example 9 | Exposed to NH$_3$ gas at RT for 6 hours | 120° C./30 min. | — |
| Example 10 | Exposed to NH$_3$ gas at RT for 72 hours | 120° C./30 min. | — |
| Example 11 | Coated with aqueous NaOH solution (0.001 | 120° C./30 min. | — |

TABLE 3-continued

Conditions of Forming Anti-Reflection Coating

| | | | |
|---|---|---|---|
| | N), and left to stand at RT for 30 min. | | |
| Example 12 | Coated with aqueous NaOH solution (0.01 N), and left to stand at RT for 30 min. | 120° C./30 min. | — |
| Example 13 | Coated with aqueous NaOH solution (0.1 N), and left to stand at RT for 30 min. | 120° C./30 min. | — |
| Example 14 | Exposed to $NH_3$ gas 6 hours at RT | 120° C./30 min. | — |
| Example 15 | Exposed to $NH_3$ gas 72 hours at RT | 120° C./30 min. | — |
| Example 16 | Coated with aqueous NaOH solution (0.001 N), and left to stand at RT for 30 min. | 120° C./30 min. | Immersed in water at RT for 15 min. |
| Example 17 | Coated with aqueous NaOH solution (0.001 N), and left to stand at RT for 30 min. | 120° C./30 min. | Immersed in water at RT for 15 min. |
| Example 18 | Coated with $NH_3$ water (15N), and left to stand at RT for 30 min. | 120° C./30 min. | — |
| Example 19 | Coated with $NH_3$ water (15N), and left to stand at RT for 30 min. | 120° C./30 min. | Immersed in water at RT for 15 min. |
| Example 20 | Coated with solution of tetraethyl ammonium hydroxide in methanol (0.0238N), and left to stand at RT for 30 min. | 120° C./30 min. | — |
| Example 21 | Coated with solution of tetraethyl ammonium hydroxide in methanol (0.0238N), and left to stand at RT for 30 min. | 120° C./30 min. | Immersed in water at RT for 15 min. |

| No. | Formation of Dense Coating | Sol | Baking Conditions of Sol Coating |
|---|---|---|---|
| Comparative Example 1 | No | Mixed Sol (I) | 80° C./30 min. + 160° C./30 min. |
| Comparative Example 2 | Yes[1] | Mixed Sol (I) | 80° C./30 min. + 160° C./30 min. |
| Comparative Example 3 | Yes[2] | Mixed Sol (I) | 80° C./30 min. + 160° C./30 min. |
| Comparative Example 4 | No | Mixed Sol (II) | 80° C./30 min. + 160° C./30 min. |
| Comparative Example 5 | No | Organically Modified Silica-Containing Sol | 150° C./1 hour |
| Comparative Example 6 | No | Organically Modified Silica-Containing Sol | 150° C./1 hour |
| Comparative Example 7 | No | Organic-Modified Silica-Containing Sol | 150° C./1 hour |
| Comparative Example 8 | No | Organic-Modified Silica-Containing Sol | 150° C./1 hour |

| No. | Alkali Treatment Conditions | Drying Conditions | Washing Conditions |
|---|---|---|---|
| Comparative Example 1 | — | — | — |
| Comparative Example 2 | — | — | — |
| Comparative Example 3 | — | — | — |
| Comparative Example 4 | — | — | — |
| Comparative Example 5 | — | — | — |
| Comparative Example 6 | Coated with aqueous NaOH solution (0.001 N), and left to stand at RT for 30 min. | 120° C./30 min. | — |
| Comparative Example 7 | Coated with aqueous NaOH solution (0.1 N), and left to stand at RT for 30 min. | 120° C./30 min. | — |
| Comparative Example 8 | Exposed to $NH_3$ gas at RT for 72 hours | 120° C./30 min. | — |

Note:
[1]A multilayer dense coating comprising a first layer of $Al_2O_3$ (refractive index: 1.64, physical thickness: 46 nm), a second layer of $Ta_2O_5$ (refractive index: 2.16, physical thickness: 23 nm), a third layer of $MgF_2$ (refractive index: 1.38, physical thickness: 24 nm), a fourth layer of $Ta_2O_5$ (physical thickness: 115 nm), a fifth layer of $MgF_2$ (physical thickness: 15 nm), and a sixth layer of $Ta_2O_5$ (physical thickness: 19 nm).
[2]A dense coating of $Al_2O_3$ (refractive index: 1.64, physical thickness: 71 nm).
[3]RT represents room temperature.

TABLE 4

Properties of Anti-Reflection Coating

| No. | Substrate | Layer Structure | Anti-Reflection Coating Refractive Index | Physical Thickness (nm) | Optical Thickness (nm) | Scratch Resistance |
|---|---|---|---|---|---|---|
| Example 1 | LASF01 ($\eta^{(1)}$: 1.79) | 1st Layer: $Al_2O_3$ | 1.64 | 46 | 75 | Excellent |
| | | 2nd Layer: $Ta_2O_5$ | 2.16 | 23 | 50 | |
| | | 3rd Layer: $MgF_2$ | 1.38 | 24 | 33 | |
| | | 4th Layer: $Ta_2O_5$ | 2.16 | 115 | 248 | |
| | | 5th Layer: $MgF_2$ | 1.38 | 15 | 21 | |
| | | 6th Layer: $Ta_2O_5$ | 2.16 | 19 | 41 | |
| | | 7th Layer: ATSAC[2] | 1.25 | 97 | 121 | |
| Example 2 | LASF01 ($\eta$: 1.79) | 1st Layer: $Al_2O_3$ | 1.64 | 46 | 75 | Excellent |
| | | 2nd Layer: $Ta_2O_5$ | 2.16 | 23 | 50 | |
| | | 3rd Layer: $MgF_2$ | 1.38 | 24 | 33 | |
| | | 4th Layer: $Ta_2O_5$ | 2.16 | 115 | 248 | |
| | | 5th Layer: $MgF_2$ | 1.38 | 15 | 21 | |
| | | 6th Layer: $Ta_2O_5$ | 2.16 | 19 | 41 | |
| | | 7th Layer: ATSAC | 1.26 | 97 | 122 | |
| Example 3 | LASF01 ($\eta$: 1.79) | 1st Layer: $Al_2O_3$ | 1.64 | 46 | 75 | Excellent |
| | | 2nd Layer: $Ta_2O_5$ | 2.16 | 23 | 50 | |
| | | 3rd Layer: $MgF_2$ | 1.38 | 24 | 33 | |
| | | 4th Layer: $Ta_2O_5$ | 2.16 | 115 | 248 | |
| | | 5th Layer: $MgF_2$ | 1.38 | 15 | 21 | |
| | | 6th Layer: $Ta_2O_5$ | 2.16 | 19 | 41 | |
| | | 7th Layer: ATSAC | 1.30 | 97 | 1.26 | |
| Example 4 | LASF01 ($\eta$: 1.79) | 1st Layer: $Al_2O_3$ | 1.64 | 46 | 75 | Excellent |
| | | 2nd Layer: $Ta_2O_5$ | 2.16 | 23 | 50 | |
| | | 3rd Layer: $MgF_2$ | 1.38 | 24 | 33 | |
| | | 4th Layer: $Ta_2O_5$ | 2.16 | 115 | 248 | |
| | | 5th Layer: $MgF_2$ | 1.38 | 15 | 21 | |
| | | 6th Layer: $Ta_2O_5$ | 2.16 | 19 | 41 | |
| | | 7th Layer: ATSAC | 1.25 | 97 | 121 | |
| Example 5 | LASF01 ($\eta$: 1.79) | 1st Layer: $Al_2O_3$ | 1.64 | 46 | 75 | Excellent |
| | | 2nd Layer: $Ta_2O_5$ | 2.16 | 23 | 50 | |
| | | 3rd Layer: $MgF_2$ | 1.38 | 24 | 33 | |
| | | 4th Layer: $Ta_2O_5$ | 2.16 | 115 | 248 | |
| | | 5th Layer: $MgF_2$ | 1.38 | 15 | 21 | |
| | | 6th Layer: $Ta_2O_5$ | 2.16 | 19 | 41 | |
| | | 7th Layer: ATSAC | 1.25 | 97 | 121 | |
| Example 6 | LASF01 ($\eta$: 1.79) | 1st Layer: $Al_2O_3$ | 1.64 | 71 | 116 | Excellent |
| | | 2nd Layer: ATSAC | 1.25 | 97 | 121 | |
| Example 7 | LASF01 ($\eta$: 1.79) | 1st Layer: $Al_2O_3$ | 1.64 | 71 | 116 | Excellent |
| | | 2nd Layer: ATSAC | 1.27 | 97 | 123 | |
| Example 8 | LASF01 ($\eta$: 1.79) | 1st Layer: $Al_2O_3$ | 1.64 | 71 | 116 | Excellent |
| | | 2nd Layer: ATSAC | 1.31 | 97 | 127 | |
| Example 9 | LASF01 ($\eta$: 1.79) | 1st Layer: $Al_2O_3$ | 1.64 | 71 | 116 | Excellent |
| | | 2nd Layer: ATSAC | 1.24 | 97 | 120 | |
| Example 10 | LASF01 ($\eta$: 1.79) | 1st Layer: $Al_2O_3$ | 1.64 | 71 | 116 | Excellent |
| | | 2nd Layer: ATSAC | 1.27 | 97 | 123 | |
| Example 11 | BK7 ($\eta$: 1.52) | ATSAC | 1.27 | 100 | 127 | Excellent |
| Example 12 | BK7 ($\eta$: 1.52) | ATSAC | 1.29 | 100 | 129 | Excellent |
| Example 13 | BK7 ($\eta$: 1.52) | ATSAC | 1.31 | 100 | 131 | Excellent |
| Example 14 | BK7 ($\eta$: 1.52) | ATSAC | 1.26 | 100 | 126 | Excellent |
| Example 15 | BK7 ($\eta$: 1.52) | ATSAC | 1.28 | 100 | 128 | Excellent |
| Example 16 | LASF01 ($\eta$: 1.79) | 1st Layer: $Al_2O_3$ | 1.64 | 46 | 75 | Excellent |
| | | 2nd Layer: $Ta_2O_5$ | 2.16 | 23 | 50 | |
| | | 3rd Layer: $MgF_2$ | 1.38 | 24 | 33 | |
| | | 4th Layer: $Ta_2O_5$ | 2.16 | 115 | 248 | |
| | | 5th Layer: $MgF_2$ | 1.38 | 15 | 21 | |
| | | 6th Layer: $Ta_2O_5$ | 2.16 | 19 | 41 | |
| | | 7th Layer: ATSAC | 1.25 | 97 | 121 | |
| Example 17 | LASF01 ($\eta$: 1.79) | 1st Layer: $Al_2O_3$ | 1.64 | 71 | 116 | Excellent |
| | | 2nd Layer: ATSAC | 1.25 | 97 | 121 | |
| Example 18 | LASF01 ($\eta$: 1.79) | 1st Layer: $Al_2O_3$ | 1.64 | 46 | 75 | Excellent |
| | | 2nd Layer: $Ta_2O_5$ | 2.16 | 23 | 50 | |
| | | 3rd Layer: $MgF_2$ | 1.38 | 24 | 33 | |
| | | 4th Layer: $Ta_2O_5$ | 2.16 | 115 | 248 | |
| | | 5th Layer: $MgF_2$ | 1.38 | 15 | 21 | |
| | | 6th Layer: $Ta_2O_5$ | 2.16 | 19 | 41 | |
| | | 7th Layer: ATSAC | 1.23 | 97 | 119 | |

TABLE 4-continued

Properties of Anti-Reflection Coating

| No. | Substrate | Layer Structure | Refractive Index | Physical Thickness (nm) | Optical Thickness (nm) | Scratch Resistance |
|---|---|---|---|---|---|---|
| Example 19 | LASF01 (η: 1.79) | 1st Layer: $Al_2O_3$ | 1.64 | 46 | 75 | Excellent |
| | | 2nd Layer: $Ta_2O_5$ | 2.16 | 23 | 50 | |
| | | 3rd Layer: $MgF_2$ | 1.38 | 24 | 33 | |
| | | 4th Layer: $Ta_2O_5$ | 2.16 | 115 | 248 | |
| | | 5th Layer: $MgF_2$ | 1.38 | 15 | 21 | |
| | | 6th Layer: $Ta_2O_5$ | 2.16 | 19 | 41 | |
| | | 7th Layer: ATSAC | 1.22 | 97 | 118 | |
| Example 20 | LASF01 (η: 1.79) | 1st Layer: $Al_2O_3$ | 1.64 | 46 | 75 | Excellent |
| | | 2nd Layer: $Ta_2O_5$ | 2.16 | 23 | 50 | |
| | | 3rd Layer: $MgF_2$ | 1.38 | 24 | 33 | |
| | | 4th Layer: $Ta_2O_5$ | 2.16 | 115 | 248 | |
| | | 5th Layer: $MgF_2$ | 1.38 | 15 | 21 | |
| | | 6th Layer: $Ta_2O_5$ | 2.16 | 19 | 41 | |
| | | 7th Layer: ATSAC | 1.21 | 97 | 117 | |
| Example 21 | LASF01 (η: 1.79) | 1st Layer: $Al_2O_3$ | 1.64 | 46 | 75 | Excellent |
| | | 2nd Layer: $Ta_2O_5$ | 2.16 | 23 | 50 | |
| | | 3rd Layer: $MgF_2$ | 1.38 | 24 | 33 | |
| | | 4th Layer: $Ta_2O_5$ | 2.16 | 115 | 248 | |
| | | 5th Layer: $MgF_2$ | 1.38 | 15 | 21 | |
| | | 6th Layer: $Ta_2O_5$ | 2.16 | 19 | 41 | |
| | | 7th Layer: ATSAC | 1.21 | 97 | 117 | |
| Comparative Example 1 | BK7 (η: 1.52) | Silica Aerogel Coating | 1.26 | 100 | 126 | Good |
| Comparative Example 2 | LASF01 (η: 1.79) | 1st Layer: $Al_2O_3$ | 1.64 | 46 | 75 | Good |
| | | 2nd Layer: $Ta_2O_5$ | 2.16 | 23 | 50 | |
| | | 3rd Layer: $MgF_2$ | 1.38 | 24 | 33 | |
| | | 4th Layer: $Ta_2O_5$ | 2.16 | 115 | 248 | |
| | | 5th Layer: $MgF_2$ | 1.38 | 15 | 21 | |
| | | 6th Layer: $Ta_2O_5$ | 2.16 | 19 | 41 | |
| | | 7th Layer: Silica Aerogel Coating | 1.23 | 97 | 119 | |
| Comparative Example 3 | LASF01 (η: 1.79) | 1st Layer: $Al_2O_3$ | 1.64 | 71 | 116 | Good |
| | | 2nd Layer: Silica Aerogel Coating | 1.22 | 97 | 118 | |
| Comparative Example 4 | BK7 (η: 1.52) | Silica Aerogel Coating | 1.24 | 100 | 124 | Good |
| Comparative Example 5 | BK7 (η: 1.52) | Organically Modified Porous Silica Aerogel Coating | 1.15 | 110 | 127 | Poor |
| Comparative Example 6 | BK7 (η: 1.52) | Organically Modified Porous Silica Aerogel Coating | 1.20 | 110 | 132 | Poor |
| Comparative Example 7 | BK7 (η: 1.52) | Organically Modified Porous Silica Aerogel Coating | 1.25 | 110 | 138 | Good |
| Comparative Example 8 | BK7 (η: 1.52) | Organically Modified Porous Silica Aerogel Coating | 1.24 | 110 | 136 | Good |

Note:
[(1)]η represents a refractive index.
[(2)]ATSAC represents an alkali-treated silica aerogel coating.

As is clear from Table 4, the anti-reflection coating of Examples 1-21 had excellent scratch resistance. On the other hand, the anti-reflection coatings of Comparative Examples 1-4 whose silica aerogel coating was not treated with an alkali, and the anti-reflection coatings of Comparative Examples 5-8 formed without using the mixed sol of the first and second acidic sols were poorer in scratch resistance than those of Examples 1-21.

Measurement of Spectral Reflectance

Using a lens reflectance meter (USPM-RU available from Olympus Corporation), the spectral reflectance of the anti-reflection coatings of Examples 2, 5, 7 and 10, and Comparative Examples 2 and 3 was measured with light rays in a wavelength range of 380-780 nm at an incident angle of 0°. The anti-reflection coatings of Examples 2 and 5 and Comparative Example 2 were measured three times; on the day when they were formed, and 1 week and 7 weeks later to examine the change of spectral reflectance with time. With respect to the anti-reflection coatings of Examples 7 and 10 and Comparative Example 3, the spectral reflectance was measured only on the day when they were formed. The results are shown in FIGS. 3-6. The anti-reflection coatings of Examples 2, 5, 7 and 10 were on the same level in spectral reflectance as those of Comparative Examples 2 and 3, which were not subjected to the alkali treatment. As is clear from FIGS. 3 and 4, the spectral reflectance of the anti-reflection coatings of Examples 2 and 5 did not change in 7 weeks. As is clear from FIG. 5, however, the spectral reflectance of the anti-reflection coating of Comparative Example 2 to light of 400-650 nm increased in 7 weeks.

Measurement of Change of Refractive Index with Time

Figure 7:
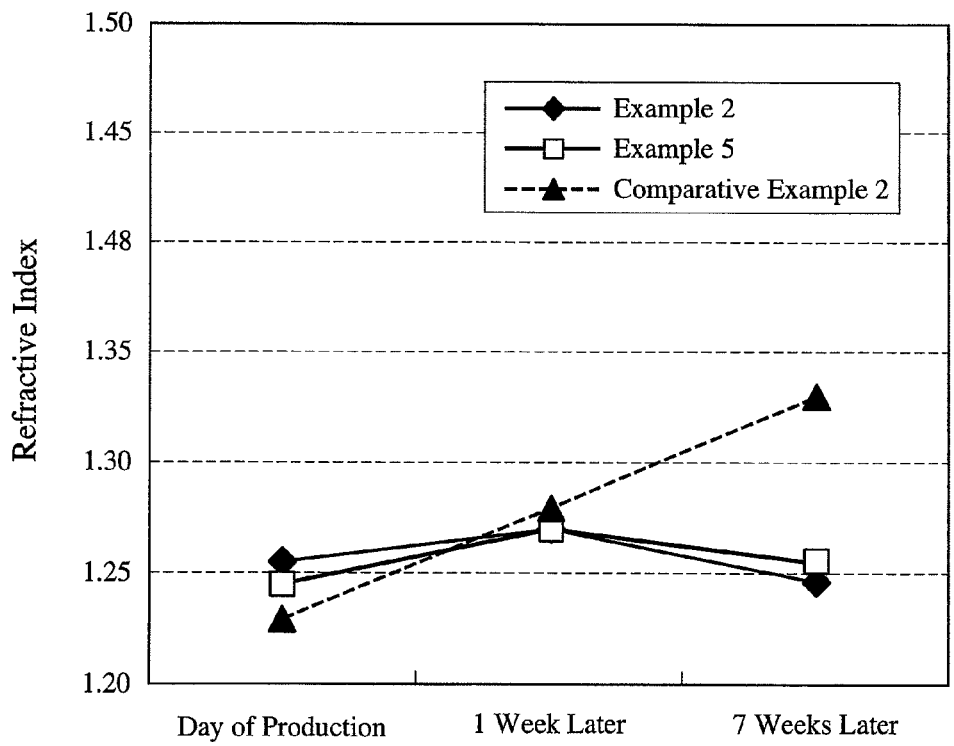
FIG. 7 is a graph showing the change of a refractive index with time in the anti-reflection coatings of Examples 2 and 5 and Comparative Example 2.

The anti-reflection coatings of Examples 2 and 5 and Comparative Example 2 were measured three times; on the day when they were formed, and 1 week and 7 weeks later to examine the change of spectral reflectance with time. The results are shown in FIG. 7. The refractive indices of the anti-reflection coatings of Example 2 and 5 did not change in 7 weeks. However, the anti-reflection coating of Comparative Example 2 had an increased refractive index, indicating that it is less resistant to deterioration than those of Examples 2 and 5.

Example 22

The above mixed sol (I) was spray-coated onto a convex surface 11 of a LAK14 glass lens 1 shown in FIG. 1 (effective diameter: 3 mm, $S/S_0$: 62%, and refractive index: 1.72), and heat-treated at 80° C. for 30 minutes and at 160° C. for 30 minutes to obtain a silica-aerogel-coated lens. 10 mL of a 0.01-N aqueous sodium hydroxide solution was spin-coated onto the silica aerogel coating, left to stand at room temperature for 30 minutes, and dried at 120° C. for 30 minutes to obtain an anti-reflection lens having an alkali-treated silica aerogel coating.

Example 23

An anti-reflection lens having an alkali-treated silica aerogel coating was obtained in the same manner as in Example 22 except for using a BK7 lens 1 (effective diameter: 3 mm, $S/S_0$: 62%, and refractive index: 1.52).

Example 24

The above mixed sol (I) was spray-coated onto a convex surface 11 of a lens 1 (effective diameter: 3 mm, $S/S_0$: 62%, refractive index: 1.51) made of a cycloolefin polymer (ZEONEX 330R available from Zeon Corporation), dried at room temperature, and heat-treated at 80° C. for 120 minutes to obtain a silica-aerogel-coated lens. 10 mL of a 0.01-N aqueous sodium hydroxide solution was spin-coated onto the silica aerogel coating, left to stand at room temperature for 30 minutes, and dried at 80° C. for 60 minutes to obtain an anti-reflection lens having an alkali-treated silica aerogel coating.

Example 25

A dense $MgF_2$ coating (refractive index: 1.38, physical thickness: 100 nm, and optical thickness: 138 nm) was formed on a convex surface 11 of a LAK14 glass lens 1 by a vacuum vapor deposition method. An alkali-treated silica aerogel coating was formed on this dense $MgF_2$ coating in the same manner as in Example 22, to obtain an anti-reflection lens.

Example 26

A dense $MgF_2$ coating (refractive index: 1.38, physical thickness: 100 nm, and optical thickness: 138 nm) was formed on a convex surface 11 of a BK7 lens 1 by a vacuum vapor deposition method. An alkali-treated silica aerogel coating was formed on this dense $MgF_2$ coating in the same manner as in Example 22, to obtain an anti-reflection lens.

Example 27

A dense $MgF_2$ coating (refractive index: 1.38, physical thickness: 100 nm, and optical thickness: 138 nm) was formed by a vacuum vapor deposition method on a convex surface 11 of a lens 1 made of the cycloolefin polymer. An alkali-treated silica aerogel coating was formed on this dense $MgF_2$ coating in the same manner as in Example 24, to obtain an anti-reflection lens.

Comparative Example 9

An organically modified silica-containing sol prepared in the same manner as in Comparative Example 5 was spin-coated onto a convex surface 11 of a LAK14 glass lens 1, air-dried at room temperature, and heat-treated at 150° C. for 1 hour, to obtain a lens having an anti-reflection coating of organically modified porous silica aerogel.

Comparative Example 10

An anti-reflection lens having an organically modified porous silica aerogel coating was produced in the same manner as in Comparative Example 9 except for using a BK7 lens 1.

Comparative Example 11

An anti-reflection lens having an organically modified porous silica aerogel coating was produced in the same manner as in Comparative Example 9, except that a lens 1 made of the cycloolefin polymer was used, and that the baking conditions of an organically modified silica-containing sol coating were 80° C. and 180 minutes.

Comparative Examples 12-14

Anti-reflection lenses were produced in the same manner as in Examples 22-24 except for conducting no alkali treatment.

Comparative Example 15

A dense $MgF_2$ coating (refractive index: 1.38, physical thickness: 100 nm, and optical thickness: 138 nm) was formed on a convex surface 11 of a LAK14 glass lens 1 by a vacuum vapor deposition method. An organically modified silica-containing sol prepared in the same manner as in Comparative Example 5 was spin-coated onto this dense $MgF_2$ coating, air-dried at room temperature, and heat-treated at 150° C. for 1 hour to obtain a lens having an anti-reflection coating of organically modified porous silica aerogel.

Comparative Example 16

A dense $MgF_2$ coating (refractive index: 1.38, physical thickness: 100 nm, and optical thickness: 138 nm) was formed on a convex surface 11 of a BK7 lens 1 by a vacuum vapor deposition method. An organically modified silica-containing sol prepared in the same manner as in Comparative Example 5 was spin-coated onto this dense $MgF_2$ coating, air-dried at room temperature, and heat-treated at 150° C. for 1 hour to obtain a lens having an anti-reflection coating of organically modified porous silica aerogel.

Comparative Example 17

A dense $MgF_2$ coating (refractive index: 1.38, physical thickness: 100 nm, and optical thickness: 138 nm) was formed by a vacuum vapor deposition method on a convex surface 11 of a lens 1 made of the cycloolefin polymer. An organically modified silica-containing sol prepared in the same manner as in Comparative Example 5 was spin-coated onto this dense MgF$_2$ coating, air-dried at room temperature, and heat-treated at 80° C. for 180 minutes to obtain a lens having an anti-reflection coating of organically modified porous silica aerogel having a refractive index of 1.15 and a physical thickness of 110 nm.

Comparative Examples 18-20

Anti-reflection lenses were produced in the same manner as in Examples 25-27 except for conducting no alkali treatment.

Comparative Example 21

A dense MgF$_2$ coating (refractive index: 1.38, and physical thickness: 91 nm) was formed on a convex surface 11 of a LAK14 glass lens 1 by a vacuum vapor deposition method, to obtain an anti-reflection lens.

Comparative Example 22

A dense MgF$_2$ coating (refractive index: 1.38, and physical thickness: 91 nm) was formed on a convex surface 11 of a BK7 lens 1 by a vacuum vapor deposition method to obtain an anti-reflection lens.

Comparative Example 23

A dense MgF$_2$ coating (refractive index: 1.38, and physical thickness: 91 nm) was formed by a vacuum vapor deposition method on a convex surface 11 of a lens 1 made of the cycloolefin polymer to obtain an anti-reflection lens.

With respect to the anti-reflection coating of Examples 22-27 and Comparative Examples 9-23, their production conditions are shown in Table 5, and their scratch resistance evaluated by the same method as described above, and their transmittance to laser light having a wavelength of 405 nm entering the convex surface 11 are shown in Table 6. Table 6 also shows the transmittance of Comparative Example 24 (LAK14 glass lens), Comparative Example 25 (BK7 glass lens) and Comparative Example 26 (cycloolefin polymer lens).

TABLE 5

Conditions of forming anti-reflection coatings

| No. | Formation of Dense Coating | Sol | Baking Conditions of Sol Coating |
|---|---|---|---|
| Example 22 | No | Mixed Sol (I) | 80° C./30 min. + 160° C./30 min. |
| Example 23 | No | Mixed Sol (I) | 80° C./30 min. + 160° C./30 min. |
| Example 24 | No | Mixed Sol (I) | 80° C./120 min. |
| Example 25 | Yes[1] | Mixed Sol (I) | 80° C./30 min. + 160° C./30 min. |
| Example 26 | Yes[1] | Mixed Sol (I) | 80° C./30 min. + 160° C./30 min. |
| Example 27 | Yes[1] | Mixed Sol (I) | 80° C./120 min. |
| Comparative Example 9 | No | Organic-Modified Silica-Containing Sol | 150° C./60 min. |
| Comparative Example 10 | No | Organic-Modified Silica-Containing Sol | 150° C./60 min. |
| Comparative Example 11 | No | Organic-Modified Silica-Containing Sol | 80° C./180 min. |
| Comparative Example 12 | No | Mixed Sol (I) | 80° C./30 min. + 160° C./30 min. |
| Comparative Example 13 | No | Mixed Sol (I) | 80° C./30 min. + 160° C./30 min. |
| Comparative Example 14 | No | Mixed Sol (I) | 80° C./120 min. |
| Comparative Example 15 | Yes[1] | Organic-Modified Silica-Containing Sol | 150° C./60 min. |
| Comparative Example 16 | Yes[1] | Organic-Modified Silica-Containing Sol | 150° C./60 min. |
| Comparative Example 17 | Yes[1] | Organic-Modified Silica-Containing Sol | 80° C./180 min. |
| Comparative Example 18 | Yes[1] | Mixed Sol (I) | 80° C./30 min. + 160° C./30 min. |
| Comparative Example 19 | Yes[1] | Mixed Sol (I) | 80° C./30 min. + 160° C./30 min. |
| Comparative Example 20 | Yes[1] | Mixed Sol (I) | 80° C./120 min. |
| Comparative Example 21 | Yes[1] | — | — |
| Comparative Example 22 | Yes[1] | — | — |
| Comparative Example 23 | Yes[1] | — | — |

| No. | Alkali Treatment Conditions | Drying Conditions | Washing Conditions |
|---|---|---|---|
| Example 22 | Coated with aqueous NaOH solution (0.01 N), and left to stand at RT for 30 min. | 120° C./30 min. | — |
| Example 23 | Coated with aqueous NaOH solution (0.01 N), and left to stand at RT for 30 min. | 120° C./30 min. | — |
| Example 24 | Coated with aqueous NaOH solution (0.01 N), and left to stand at RT for 30 min. | 80° C./60 min. | — |

TABLE 5-continued

Conditions of forming anti-reflection coatings

| | | | |
|---|---|---|---|
| Example 25 | Coated with aqueous NaOH solution (0.01 N), and left to stand at RT for 30 min. | 120° C./30 min. | — |
| Example 26 | Coated with aqueous NaOH solution (0.01 N), and left to stand at RT for 30 min. | 120° C./30 min. | — |
| Example 27 | Coated with aqueous NaOH solution (0.01 N), and left to stand at RT for 30 min. | 80° C./60 min. | — |
| Comparative Example 9 | — | — | — |
| Comparative Example 10 | — | — | — |
| Comparative Example 11 | — | — | — |
| Comparative Example 12 | — | — | — |
| Comparative Example 13 | — | — | — |
| Comparative Example 14 | — | — | — |
| Comparative Example 15 | — | — | — |
| Comparative Example 16 | — | — | — |
| Comparative Example 17 | — | — | — |
| Comparative Example 18 | — | — | — |
| Comparative Example 19 | — | — | — |
| Comparative Example 20 | — | — | — |
| Comparative Example 21 | — | — | — |
| Comparative Example 22 | — | — | — |
| Comparative Example 23 | — | — | — |

Note:
[1] A dense coating of $MgF_2$ (refractive index: 1.38, physical thickness: 91 nm).

TABLE 6

Properties of anti-reflection coatings and light transmittance of lenses

| No. | Substrate | Anti-Reflection Coating Layer Structure | Refractive Index | Physical Thickness (nm) | Optical Thickness (nm) | Scratch Resistance | Light Transmittance (%) |
|---|---|---|---|---|---|---|---|
| Example 22 | LAK14 ($\eta^{(1)}$: 1.72) | Alkali-Treated Silica Aerogel Coating | 1.25 | 100 | 125 | Excellent | 89.5 |
| Example 23 | BK7 ($\eta$: 1.52) | Alkali-Treated Silica Aerogel Coating | 1.25 | 110 | 125 | Excellent | 92.3 |
| Example 24 | Cycloolefin Polymer ($\eta$: 1.51) | Alkali-Treated Silica Aerogel Coating | 1.25 | 100 | 125 | Excellent | 92.2 |
| Example 25 | LAK14 ($\eta$: 1.72) | 1st Layer: $MgF_2$ | 1.38 | 100 | 138 | Excellent | 90.4 |
| | | 2nd Layer: Alkali-Treated Silica Aerogel Coating | 1.25 | 100 | 125 | | |
| Example 26 | BK7 ($\eta$: 1.52) | 1st Layer: $MgF_2$ | 1.38 | 100 | 138 | Excellent | 90.6 |
| | | 2nd Layer: Alkali-Treated Silica Aerogel Coating | 1.25 | 100 | 125 | | |
| Example 27 | Cycloolefin Polymer ($\eta$: 1.51) | 1st Layer: $MgF_2$ | 1.38 | 100 | 138 | Excellent | 90.7 |
| | | 2nd Layer: Alkali-Treated Silica Aerogel Coating | 1.25 | 100 | 125 | | |
| Comparative Example 9 | LAK14 ($\eta$: 1.72) | Organically Modified Porous Silica Aerogel Coating | 1.15 | 130 | 150 | Poor | 89.2 |
| Comparative Example 10 | BK7 ($\eta$: 1.52) | Organically Modified Porous Silica Aerogel Coating | 1.15 | 130 | 150 | Poor | 93.0 |
| Comparative Example 11 | Cycloolefin Polymer ($\eta$: 1.51) | Organically Modified Porous Silica Aerogel Coating | 1.15 | 110 | 127 | Poor | 92.4 |
| Comparative Example 12 | LAK14 ($\eta$: 1.72) | Silica Aerogel Coating | 1.20 | 119 | 143 | Good | 89.7 |
| Comparative Example 13 | BK7 ($\eta$: 1.52) | Silica Aerogel Coating | 1.20 | 115 | 138 | Good | 92.8 |
| Comparative Example 14 | Cycloolefin Polymer ($\eta$: 1.51) | Silica Aerogel Coating | 1.25 | | | | |

TABLE 6-continued

Properties of anti-reflection coatings and light transmittance of lenses

| | | | | |
|---|---|---|---|---|
| Comparative Example 14 | 100 | 125 | Good | 92.6 |

| | | Anti-Reflection Coating | |
|---|---|---|---|
| No. | Substrate | Layer Structure | Refractive Index |
| Comparative Example 15 | LAK14 ($\eta$: 1.72) | 1st Layer: $MgF_2$<br>2nd Layer: Organically Modified Porous Silica Aerogel Coating | 1.38<br>1.15 |
| Comparative Example 16 | BK7 ($\eta$: 1.52) | 1st Layer: $MgF_2$<br>2nd Layer: Organically Modified Porous Silica Aerogel Coating | 1.38<br>1.15 |
| Comparative Example 17 | Cycloolefin Polymer ($\eta$: 1.51) | 1st Layer: $MgF_2$<br>2nd Layer: Organically Modified Porous Silica Aerogel Coating | 1.38<br>1.15 |
| Comparative Example 18 | LAK14 ($\eta$: 1.72) | 1st Layer: $MgF_2$<br>2nd Layer: Silica Aerogel Coating | 1.38<br>1.20 |
| Comparative Example 19 | BK7 ($\eta$: 1.52) | 1st Layer: $MgF_2$<br>2nd Layer: Silica Aerogel Coating | 1.38<br>1.20 |
| Comparative Example 20 | Cycloolefin Polymer ($\eta$: 1.51) | 1st Layer: $MgF_2$<br>2nd Layer: Silica Aerogel Coating | 1.38<br>1.20 |
| Comparative Example 21 | LAK14 ($\eta$: 1.72) | $MgF_2$ | 1.38 |
| Comparative Example 22 | BK7 ($\eta$: 1.52) | $MgF_2$ | 1.38 |
| Comparative Example 23 | Cycloolefin Polymer ($\eta$: 1.51) | $MgF_2$ | 1.38 |
| Comparative Example 24 | LAK14 ($\eta$: 1.72) | — | — |
| Comparative Example 25 | BK7 ($\eta$: 1.52) | — | — |
| Comparative Example 26 | Cycloolefin Polymer ($\eta$: 1.51) | — | — |

| | Anti-Reflection Coating | | | |
|---|---|---|---|---|
| No. | Physical Thickness (nm) | Optical Thickness (nm) | Scratch Resistance | Light Transmittance (%) |
| Comparative Example 15 | 100<br>120 | 138<br>138 | Poor | 93.3 |
| Comparative Example 16 | 100<br>130 | 138<br>150 | Poor | 89.9 |
| Comparative Example 17 | 100<br>110 | 138<br>127 | Poor | 93.1 |
| Comparative Example 18 | 100<br>120 | 138<br>144 | Good | 88.6 |
| Comparative Example 19 | 100<br>120 | 138<br>144 | Good | 92.1 |
| Comparative Example 20 | 100<br>120 | 138<br>144 | Good | 92.2 |
| Comparative Example 21 | 91 | 126 | Excellent | 88.1 |
| Comparative Example 22 | 91 | 126 | Excellent | 89.4 |
| Comparative Example 23 | 91 | 126 | Excellent | 89.4 |
| Comparative Example 24 | — | — | — | 81.1 |
| Comparative Example 25 | — | — | — | 85.7 |
| Comparative Example 26 | — | — | — | 85.8 |

Note:
[1] $\eta$ represents a refractive index.

As is clear from Table 6, the anti-reflection lenses of Examples 22-27 had excellent scratch resistance and anti-reflection performance. On the other hand, the anti-reflection lenses of Comparative Examples 9-11 and 15-17 using no mixed sol of the first and second acidic sols, and those of Comparative Examples 12-14 and 18-20 having silica aerogel coatings not subjected to the alkali treatment were poorer in scratch resistance than those of Examples 22-27. The anti-reflection lenses of Comparative Examples 21-23 having no alkali-treated silica aerogel coating were poorer in anti-reflection performance than those of Examples 22-27. The lenses of Comparative Examples 24-26 having no anti-reflection coating were clearly poorer in anti-reflection performance than those of Examples 22-27.

EFFECT OF THE INVENTION

According to the present invention, an anti-reflection coating comprising at least a silica aerogel coating having a low refractive index and excellent scratch resistance can be formed in a relatively short period of time by preparing a mixed sol of a first acidic sol obtained by the hydrolysis and polymerization of alkoxysilane using a base catalyst and an acid catalyst in this order, and a second acidic sol obtained by the hydrolysis and polymerization of alkoxysilane in the presence of an acid catalyst in a relatively short period of time, applying the mixed sol to a substrate, drying it, and alkali-treating the resultant silica aerogel coating. Such a silica aerogel coating has a structure in which smaller silica particles formed from the first acidic sol exist in gaps between larger silica particles formed from the second acidic sol, and unreacted silanol groups are condensed by the alkali treatment to increase Si—O—Si bonds. Accordingly, the anti-reflection coating of the present invention has excellent scratch resistance, with reduced change of a refractive index with time.

The present disclosure relates to subject matter contained in Japanese Patent Application No. 2008-078477 filed on Mar. 25, 2008, which is expressly incorporated herein by reference in its entirety.

What is claimed is:

1. A method for forming an anti-reflection coating of alkali-treated silica aerogel on a substrate, comprising:
   hydrolyzing and polymerizing alkoxysilane in a solvent in the presence of a base catalyst to prepare an alkaline sol,
   adding an acid catalyst to the alkaline sol to carry out further hydrolysis and polymerization to prepare a first acidic sol,
   hydrolyzing and polymerizing alkoxysilane in a solvent in the presence of an acid catalyst to prepare a second acidic sol,
   mixing said first and second acidic sols,
   applying the resultant mixed sol to said substrate,
   drying it,
   treating the resultant silica aerogel coating with an alkali solution at a temperature of 1-40° C. for 0.1-10 hours, and
   drying it at a temperature of 100-200° C. for 15 minutes to 24 hours.

2. A method for forming an anti-reflection coating comprising a single-layer or multilayer dense coating and an alkali-treated silica aerogel coating on a substrate, comprising:
   forming a single-layer or multilayer dense coating comprising at least one of an inorganic layer, a composite layer of fine inorganic particles and a binder and a resin layer on said substrate,
   hydrolyzing and polymerizing alkoxysilane in a solvent in the presence of a base catalyst to prepare an alkaline sol, adding an acid catalyst to the alkaline sol to carry out further hydrolysis and polymerization to prepare a first acidic sol, hydrolyzing and polymerizing alkoxysilane in a solvent in the presence of an acid catalyst to prepare a second acidic sol, mixing said first and second acidic sols, applying the resultant mixed sol to said single-layer or multilayer dense coating, drying it, treating the resultant silica aerogel coating with an alkali solution at a temperature of 1-40° C. for 0.1-10 hours, and drying it at a temperature of 100-200° C. for 15 minutes to 24 hours.

3. The method for forming an anti-reflection coating according to claim 1, wherein said first acidic sol is prepared using tetraalkoxysilane or its oligomer as said alkoxysilane, ammonia as said base catalyst, and methanol as said solvent.

4. The method for forming an anti-reflection coating according to claim 1, wherein said second acidic sol is prepared using at least one selected from the group consisting of methyltrialkoxysilane, tetraalkoxysilane and their oligomers as said alkoxysilane, hydrochloric acid as said acid catalyst, and methanol and/or ethanol as said solvent.

5. The method for forming an anti-reflection coating according to claim 1, wherein the solid content mass ratio of the first acidic sol to the second acidic sol in said mixed sol is 5-90.

6. The method for forming an anti-reflection coating according to claim 1, wherein an average particle size ratio of silica particles in the first acidic sol to silica particles in the second acidic sol in said mixed sol is 5-50.

7. The method for forming an anti-reflection coating according to claim 1, wherein the concentration of said alkali solution is $1 \times 10^{-4}$ N to 20 N.

8. The method for forming an anti-reflection coating according to claim 1, wherein said alkali-treated silica aerogel coating has a physical thickness of 15-500 nm.

9. The method for forming an anti-reflection according to claim 1, wherein said alkali solution is at least one solution selected from the group consisting of aqueous sodium hydroxide solution, ammonia water, and solution of tetraethyl ammonium hydroxide in methanol.

10. The method for forming an anti-reflection according to claim 2, wherein said alkali solution is at least one solution selected from the group consisting of aqueous sodium hydroxide solution, ammonia water, and solution of tetraethyl ammonium hydroxide in methanol.

\* \* \* \* \*